(12) United States Patent
Yamada

(10) Patent No.: US 10,606,534 B2
(45) Date of Patent: Mar. 31, 2020

(54) SERVER SYSTEM, TERMINAL DEVICE, OPERATING INFORMATION COLLECTION SYSTEM, PROGRAM, SERVER SYSTEM OPERATING METHOD, AND TERMINAL DEVICE OPERATING METHOD

(71) Applicant: SEIKO EPSON CORPORATION, Tokyo (JP)

(72) Inventor: Yusuke Yamada, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/052,011

(22) Filed: Aug. 1, 2018

(65) Prior Publication Data

US 2019/0042170 A1 Feb. 7, 2019

(30) Foreign Application Priority Data

Aug. 2, 2017 (JP) .................................. 2017-150127
Apr. 20, 2018 (JP) .................................. 2018-081101

(51) Int. Cl.
*G06F 3/12* (2006.01)
*H04N 1/00* (2006.01)

(52) U.S. Cl.
CPC .......... *G06F 3/1259* (2013.01); *G06F 3/1207* (2013.01); *G06F 3/1292* (2013.01); *H04N 1/00177* (2013.01); *H04N 1/00206* (2013.01)

(58) Field of Classification Search
None
See application file for complete search history.

(56) References Cited

U.S. PATENT DOCUMENTS

| 6,906,815 B1* | 6/2005 | Miyake | G06F 3/1207 358/1.14 |
|---|---|---|---|
| 2011/0242557 A1* | 10/2011 | Sato | G06F 3/1207 358/1.9 |
| 2013/0057882 A1* | 3/2013 | Ohta | G06F 9/5011 358/1.9 |
| 2016/0306596 A1* | 10/2016 | Yasuda | G06F 3/1226 |
| 2017/0173889 A1* | 6/2017 | Thomas-Lepore | H04N 1/4433 |

FOREIGN PATENT DOCUMENTS

JP 2008-242564 A 10/2008

* cited by examiner

*Primary Examiner* — Lennin R Rodriguez Gonzalez
(74) *Attorney, Agent, or Firm* — Workman Nydegger

(57) ABSTRACT

A server system, a terminal device, an operating information collection system, a program, a server system operating method, and a terminal device operating method communicate information for appropriately displaying the time until printing is completed when using a terminal device to monitor the time until a job on the monitored device will be completed. A server system 7 is a server system that collects operating information of a monitored device, and includes a communicator 731 and a processor 71. The processor 71 causes the communicator 731 to send job completion time information to a terminal device 9, and when a specific event causing a change in the time until job completion occurs, sends correction information for the job completion time information to the terminal device 9 by push notification.

17 Claims, 13 Drawing Sheets

| TYPE | ADDRESS | OPERATING INFORMATION |
|---|---|---|
| TIME SINCE POWER ON | a1 | v1 |
| Y INK CONSUMPTION | a2 | v2 |
| M INK CONSUMPTION | a3 | v3 |
| C INK CONSUMPTION | a4 | v4 |
| K INK CONSUMPTION | a5 | v5 |
| CUMULATIVE ROLLER ROTATIONS | a6 | v6 |
| ⋮ | ⋮ | ⋮ |

FIG. 6

| ACQUISITION TIME | PRINTER IDENTIFICATION INFORMATION | OPERATING INFORMATION |
|---|---|---|
| t1 | id1 | ... |
| t2 | id1 | ... |
| t3 | id3 | ... |
| t4 | id2 | ... |
| t5 | id5 | ... |
| t6 | id2 | ... |
| ⋮ | ⋮ | ⋮ |

| TYPE | VALUE | EVENT |
|---|---|---|
| STATUS INFORMATION | PRINTING, STANDBY, ALARM, OR ERROR | STATUS CHANGE |
| REMAINING TIME INFORMATION | HOURS/MINUTES (ex: 1:45) | CHANGE OF REMAINING TIME |
| CONSUMPTION, REMAINING AMOUNT OF CONSUMABLES | %, m (ex: 60%, 75 m) | CONSUMPTION OF SPECIFIC AMOUNT |
| JOB NAME | FILE NAME (ex: Sample_image.pdf) | START OF NEW JOB |

FIG. 9

SERVER SYSTEM, TERMINAL DEVICE, OPERATING INFORMATION COLLECTION SYSTEM, PROGRAM, SERVER SYSTEM OPERATING METHOD, AND TERMINAL DEVICE OPERATING METHOD

BACKGROUND

1. Technical Field

The present invention relates to a server system, a terminal device, an operating information collection system, a program, a server system operating method, and a terminal device operating method.

2. Related Art

Server systems that collect operating information from multiple devices connected to a network are known from the literature. Such operating information may be collected from many different types of devices, including production equipment such as printers.

The operating information collected by the server system may also be used in many different ways. For example, the server system may send the collected operating information to a terminal device used by a user. In this event, the user can use the terminal device to check the operating status of a printer, for example. A user in a location remote from the printer may also use the operating information to remotely monitor the operating status of the printer (such as the progress of a print job).

JP-A-2008-242564 teaches a method of displaying, on a display device of a terminal connected to an image processing device through a network, an indicator of the length of time required for processing by the image processing device to start after a job processing request is sent to the image processing device, and a method of changing the display format according to the length of the wait.

When remotely monitoring the operating status of a device from which operating information is collected (referred to below as a "monitored device"), it is useful for information related to the time when a job will be completed (including remaining time information) to be received by the terminal device and displayed. However, while the method described in JP-A-2008-242564 enables checking an indicator of when printing will start, it does not enable checking the time until printing ends. In other words, JP-A-2008-242564 displays the estimated queuing time on the printer driver when a print job is passed to the printer driver, but does not enable monitoring job progress after the job is passed to the printer driver.

The method of the related art described in JP-A-2008-242564 also does not disclose a method of appropriately displaying the time until printing is completed when monitoring job progress on the terminal device.

SUMMARY

The several embodiments of the invention include a server system, a terminal device, an operating information collection system, a program, a server system operating method, and a terminal device operating method configured to communicate information for appropriately displaying the time until printing is completed when using a terminal device to monitor the job completion time information of a monitored device.

One aspect of the invention is a server system configured to collect operating information of a monitored device through a network, the server system including: a communicator configured to receive, from the monitored device, operating information including at least job completion time information indicating an expected time of job completion on the monitored device; and a processor configured to control communication by the communicator; the processor sending, to a terminal device configured to display the job completion time information, the job completion time information received from the monitored device, and when a specific event causing a change in the time until job completion occurs on the monitored device, sends correction information for the job completion time information to the terminal device by push notification.

Triggered by a specific event occurring on the device of which operating information is monitored, correction information for the job completion time information is sent from the server system that collects operating information to the terminal device in this aspect of the invention. Because correction information is sent by this configuration when there is a strong possibility that a discrepancy may result between the time to job completion and the job completion time information, the appropriate job completion time information can be displayed on the terminal device.

In another aspect of the invention the correction information is information based on the job completion time information the communicator received from the monitored device in response to the specific event.

Thus comprised, the terminal device can be controlled to correct the job completion time information based on information from the monitored device where the event occurred.

In another aspect of the invention, the information based on the job completion time information is new job completion time information expected after the timing when the specific event occurred, or is time difference information indicating a difference due to the specific event to the job completion time information.

In this aspect of the invention, the terminal device can be controlled to correct the job completion time information based on new job completion time information or time difference information.

In another aspect of the invention, the job completion time information is remaining time information to job completion; and the communicator, when the remaining time information count-down process is executed on the terminal device, sends the correction information including an instruction to stop the count-down process on the terminal device to the terminal device by push notification.

By stopping the count-down process of the remaining time information, this aspect of the invention can control the terminal device to correct the job completion time information.

In a server system according to another aspect of the invention, the communicator receives from the monitored device, directly or through another device, the job completion time information newly expected after the timing when the specific event occurred; and the processor sends the newly expected job completion time information as the correction information to the terminal device by push notification.

Thus comprised, job completion time information received from the monitored device directly or through another device is sent as the correction information to the terminal device by a push notification.

In another aspect of the invention, the communicator receives, from the monitored device, directly or through another device, time difference information indicating a difference due to the specific event to the job completion time information; and the processor sends the time difference information as the correction information to the terminal device by push notification, or sends new job completion time information obtained based on the time difference information as the correction information to the terminal device.

Thus comprised, the time difference information received directly or through another device from the monitored device is sent as the correction information to the terminal device by push notification, or the time difference information is converted to job completion time information and sent to the terminal device by push notification.

In another aspect of the invention, the correction information is information indicating an event type of the specific event.

This aspect of the invention can control the terminal device to execute a job completion time information correction process according to the event type.

In another aspect of the invention, the communicator receives from the monitored device, directly or through another device, information indicating an event type of the specific event; and the processor sends the information indicating the event type as the correction information to the terminal device, or identifies, based on the information indicating the event type, time difference information indicating a difference to the job completion time information due to the specific event, and sends the identified time difference information as the correction information to the terminal device by push notification, or sends new job completion time information acquired based on the time difference information as the correction information to the terminal device by push notification.

When information indicating the event type is received in this aspect of the invention, correction information can be sent in various formats to the terminal device by push notification.

In another aspect of the invention, the processor, when information indicating an event type that enables predicting an event execution time is received, sends information indicating the event type, or the time difference information, or the job completion time information, to the communicator by push notification at the time the event occurs, and when information indicating an event type that does not enable predicting an event execution time is received, sends information indicating the time difference information, or the job completion time information, to the communicator by push notification at the time the event ends.

This aspect of the invention enables sending correction information by push notification to the terminal device in a format appropriate to the event type.

In another aspect of the invention, the monitored device is a printer; and the specific event is at least one of a cleaning operation event, a print medium jam event, a no-print media event, a no-ink event, or an event indicating movement of the ink head is less than a specific amount.

Triggered by a specific event occurring on the paper length, this aspect of the invention can control the terminal device to execute a job completion time information correction process.

Another aspect of the invention is a terminal device communicatively connected through a network to a server system that collects operating information of a monitored device, the terminal device including: a processor configured to execute a count-down process of remaining time information of a job running on the monitored device; and a communicator configured to receive correction information correcting the remaining time information when a specific event causing a change in the time until job completion occurs on the monitored device; the communicator receiving the correction information by push notification from the monitored device; and the processor, based on the received correction information, correcting the remaining time information.

In this aspect of the invention, correction information is received and a remaining time information correction process is executed triggered by a specific event occurring on the device of which operating information is monitored in conjunction with a remaining time information count-down process. Because a correction process can be executed in this configuration when there is a strong possibility that a discrepancy may result in the remaining time information, acquisition of appropriate remaining time information by the terminal device can be achieved by efficient communication.

In a terminal device according to another aspect of the invention, the correction information includes first report information corresponding to the specific event occurring, and second report information corresponding to a job resuming; and the processor stops the count-down process based on the first report information, and resumes the count-down process based on the second report information.

This aspect of the invention enables correcting the remaining time information by stopping and resuming the count-down process.

In a terminal device according to another aspect of the invention, the correction information is information indicating an event type of the specific event; and the processor, executes a process correcting the remaining time information based on time difference information appropriate to the event type of the specific event.

This aspect of the invention enables correcting the remaining time information based on the event type.

Another aspect of the invention is an operating information collection system including the server system and the terminal device as described above.

Another aspect of the invention is a program controlling operation of a terminal device communicatively connected through a network to a server system that collects operating information of a monitored device; the program causing the terminal device to function as a processor configured to execute a count-down process of remaining time information of a job running on the monitored device, and a communicator configured to receive correction information correcting the remaining time information when a specific event causing a change in the time until job completion occurs on the monitored device; the communicator receiving the correction information by push notification from the monitored device through the network by push notification; and the processor, based on the received correction information, correcting the remaining time information.

Another aspect of the invention is an operating method of a server system configured to collect operating information of a monitored device through a network, including receiving, from the monitored device, job completion time information indicating an expected time of job completion on the monitored device; sending, to a terminal device configured to display the job completion time information, the job completion time information received from the monitored device; and when a specific event causing a change in the time until job completion occurs on the monitored device, sending correction information for the job completion time information to the terminal device by push notification.

Another aspect of the invention is an operating method of a terminal device communicatively connected through a network to a server system that collects operating information of a monitored device, including: executing a countdown process of remaining time information of a job running on the monitored device; receiving correction information correcting the remaining time information when a specific event causing a change in the time until job completion occurs on the monitored device by push notification from the monitored device; and based on the received correction information, correcting the remaining time information.

Other objects and attainments together with a fuller understanding of the invention will become apparent and appreciated by referring to the following description and claims taken in conjunction with the accompanying drawings.

BRIEF DESCRIPTION OF THE DRAWINGS

FIG. 6 shows an example of the data structure of operating information stored by a printer.

FIG. 9 shows a specific example of first information.

DESCRIPTION OF EMBODIMENTS

Preferred embodiments of the present invention are described below with reference to the accompanying figures. Note that the embodiments described below do not unduly limit the scope of the invention described in the accompanying claims. Note also that all elements and configuration described in the following embodiments are not necessarily essential elements of the invention.

The monitored device from which operating information is collected is a printer (printing device) in the embodiments described below, but monitored devices may be extended to include other devices. Examples of such other devices include paper recycling and manufacturing systems, robots, and other types of production equipment other than printers.

1. Operating Information Collection System

Figure 1:
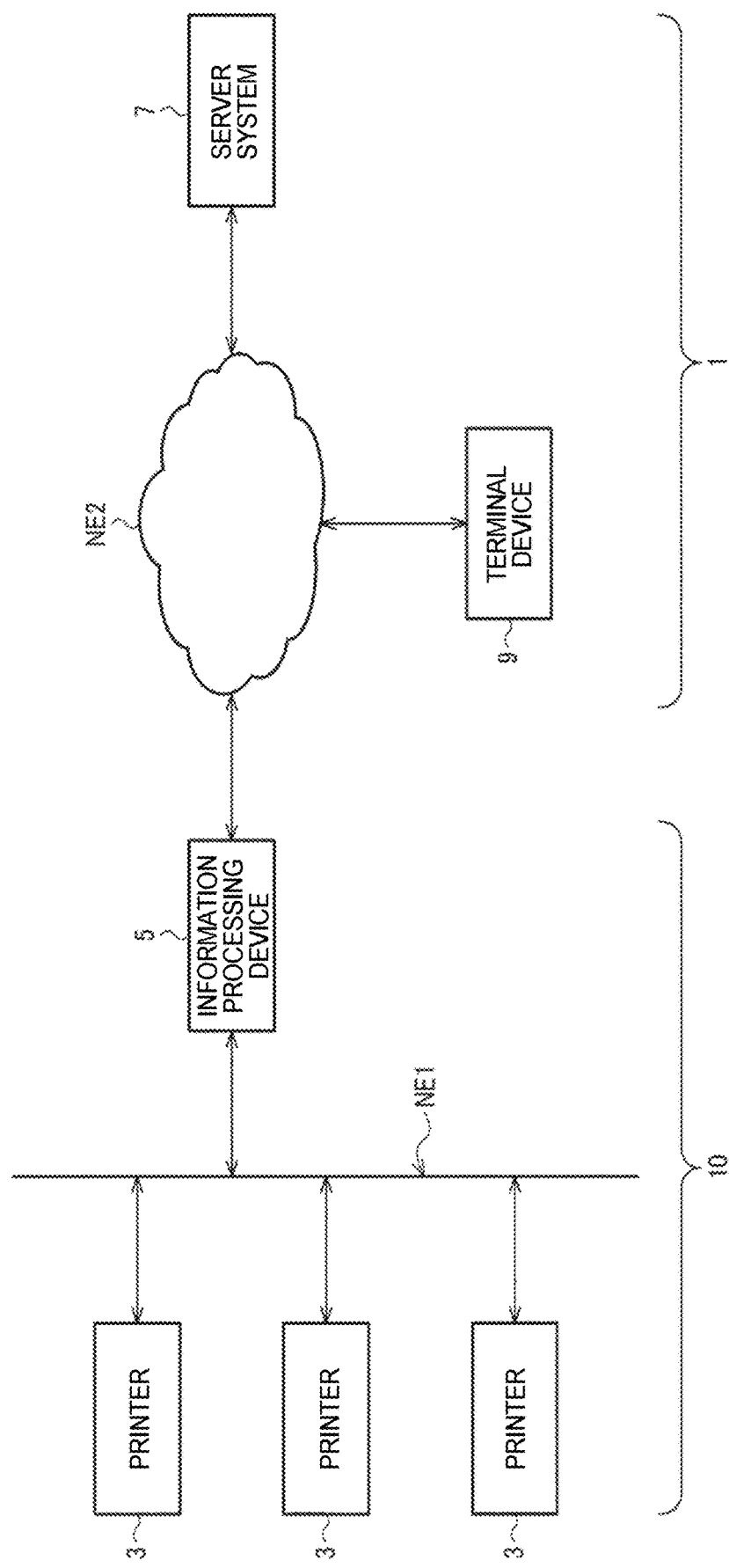
FIG. 1 illustrates the configuration of an operating information collection system.

FIG. 1 shows an example of an operating information collection system according to the invention.

The operating information collection system 1 includes a server system 7 that collects operating information from a printer 3 through an information processing device 5; and a terminal device 9.

The server system 7 sends the collected operating information to the terminal device 9.

The information sent to the terminal device 9 does not need to include all operating information collected by the server system 7. For example, the server system 7 may extract and send some of the collected operating information to the terminal device 9, or first process operating information by statistical analysis, for example, and send the processed information to the terminal device 9.

The terminal device 9 reports the information received from the server system 7 by presenting it on a display or audibly, for example.

However, a system including the operating information collection system 1 is not limited to the configuration shown in FIG. 1, and may be configured without some of the described components, or with additional components, as appropriate. For example, the information processing device 5 shown in FIG. 1 may be omitted, and the printers 3 may connect to the network NE2 (Internet) directly.

As shown in FIG. 1, multiple printers 3 and an information processing device 5 are connected to a network NE1, and communicate bidirectionally through the network NE1.

The information processing device 5 and server system 7 connect to the network NE2, and communicate bidirectionally through the network NE2.

The terminal device 9 also connects to the network NE2, and the server system 7 and terminal device 9 communicate bidirectionally through the network NE2.

For example, network NE1 in this example is a LAN (Local Area Network), and network NE2 is the Internet. However, the LAN and Internet are examples of a communication connection, and the communication connections between the printer 3 and information processing device 5, the information processing device 5 and server system 7, and the server system 7 and terminal device 9 are not limited to any specific configuration.

The system 10 including multiple printers 3, a LAN, and information processing device 5 collects operating information from the printers 3 through the information processing device 5, and outputs to an external server system 7. The information processing device 5 is a device deployed in a facility of the same corporation, and may be a PC (personal computer) or an in-house server. Note also that while only one system 10 is shown in FIG. 1, multiple systems 10 may connect to the server system 7.

As described below referring to FIG. 2, the printer 3 has a display 333. This enables the user to monitor the status of the printer by reading the operating information presented on the display 333 if the user is working near the printer 3. However, the user may be working away from the printer 3.

For example, in a small or mid-size company (or office) with few employees, the user may need to handle tasks other than operating the printer 3, such as bookkeeping, sales, and product deliveries, and may often be away from the printer 3. In this event, a system enabling the user to monitor the operating status of the printer 3 through the terminal device 9 must be deployed. More specifically, by the terminal device 9 receiving, displaying, and reporting information based on operating information collected by the server system 7, the user can remotely monitor the operating status of the printers 3.

In addition, in a relatively large business, an operator may be stationed near each printer 3 (on a production line, for example). However, a manager responsible for multiple production lines cannot constantly read the display 333 of every printer 3. To appropriately monitor the overall progress of operations, information must be displayed on the terminal device 9, and the operating information collection system 1 such as shown in FIG. 1 is useful for such applications.

Note that only one terminal device 9 is shown in FIG. 1, but there may obviously be multiple terminal devices 9. For example, multiple users in a business using a single system 10 may use separate terminal devices 9 to receive and monitor operating information. When multiple systems 10 are connected to the server system 7, one or multiple terminal devices 9 may also be used in each system 10.

2. Device Configurations

Examples of the configuration of a printer 3, information processing device 5, server system 7, and terminal device 9 are described next.

2.1 Printer

Figure 2:
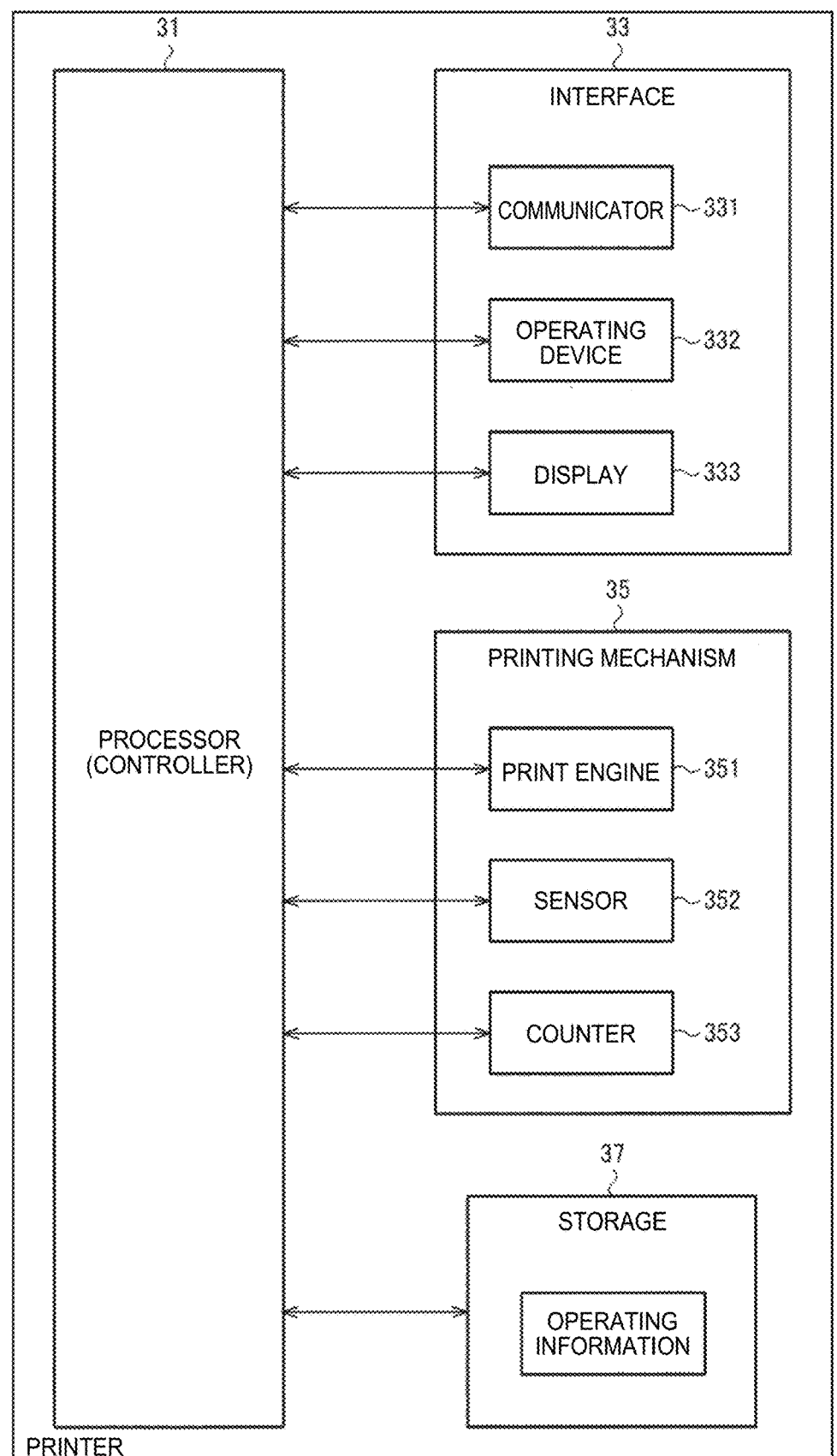
FIG. 2 is a block diagram illustrating the configuration of a printer.

FIG. 2 is a block diagram shows an example of the configuration of the printer 3. The printer 3 has a processor 31, interface 33, printing mechanism 35, and storage 37.

The processor 31 centrally controls operations executed by the printer 3. The function of the processor 31 is embodied by hardware such as a CPU (Central Processing Unit), ASIC (Application Specific Integrated Circuit, gate array), or other processor, and a program. The interface 33, printing mechanism 35 and storage 37 operate as controlled by the processor 31.

The interface 33 includes a communicator 331, operating device 332, and display 333.

The communicator 331 connects to a LAN, and communicates through the LAN with the information processing device 5.

The operating device 332 comprises buttons or other means for receiving input operations from the user.

The display 333 comprises a display device for presenting information related to the printer 3 to the user.

Note that the operating device 332 and the display 333 may be integrated into a single device such as a touch panel.

The printing mechanism 35 includes a print engine 351, sensor 352, and counter 353.

The print engine 351 is a mechanical configuration for printing images on print media. In this example, the print engine 351 prints images on print media by ejecting ink from an inkjet head onto rolled print media conveyed roll-to-roll. The specific configuration of the print engine 351 is not limited to this configuration, and the print engine 351 may print to cut-sheet print media, or print like a laser printer using toner.

The sensor 352 detects physical quantities related to the operating status of the print engine 351, and the counter 353 counts various values that change in conjunction with operation of the print engine 351.

Examples of physical quantities indicating the operating status of the print engine 351 include the voltage applied to electrical components of the print engine 351, the temperature and humidity in the print engine 351, and the positions of the printhead and print media. Different sensors 352 are provided to detect these physical quantities, such as a voltage sensor, temperature and humidity sensors, positioning sensors, and an acceleration sensor.

Examples of values that change in conjunction with print engine 351 operation include the time past since the print engine 351 was energized, the cumulative length of print media printed, ink consumption (or remaining ink level), and the cumulative number of rotations of mechanical components that rotate (such as the rollers for conveying the print media). Different counters 353 are also provided to count these different values.

The storage 37 may include storage media such as a HDD (Hard Disk Drive), ROM (Read Only Memory), or RAM (Random Access Memory). The storage 37 stores operating information indicating the operating status of the printer 3, such as printer 3 status information (errors and alarms, for example), identification information for jobs executed by the printer 3 (such as job names), information indicating job progress (printing time information, progress information), or data output from the sensors 352 and counters 353.

2.2 Information Processing Device

Figure 3:
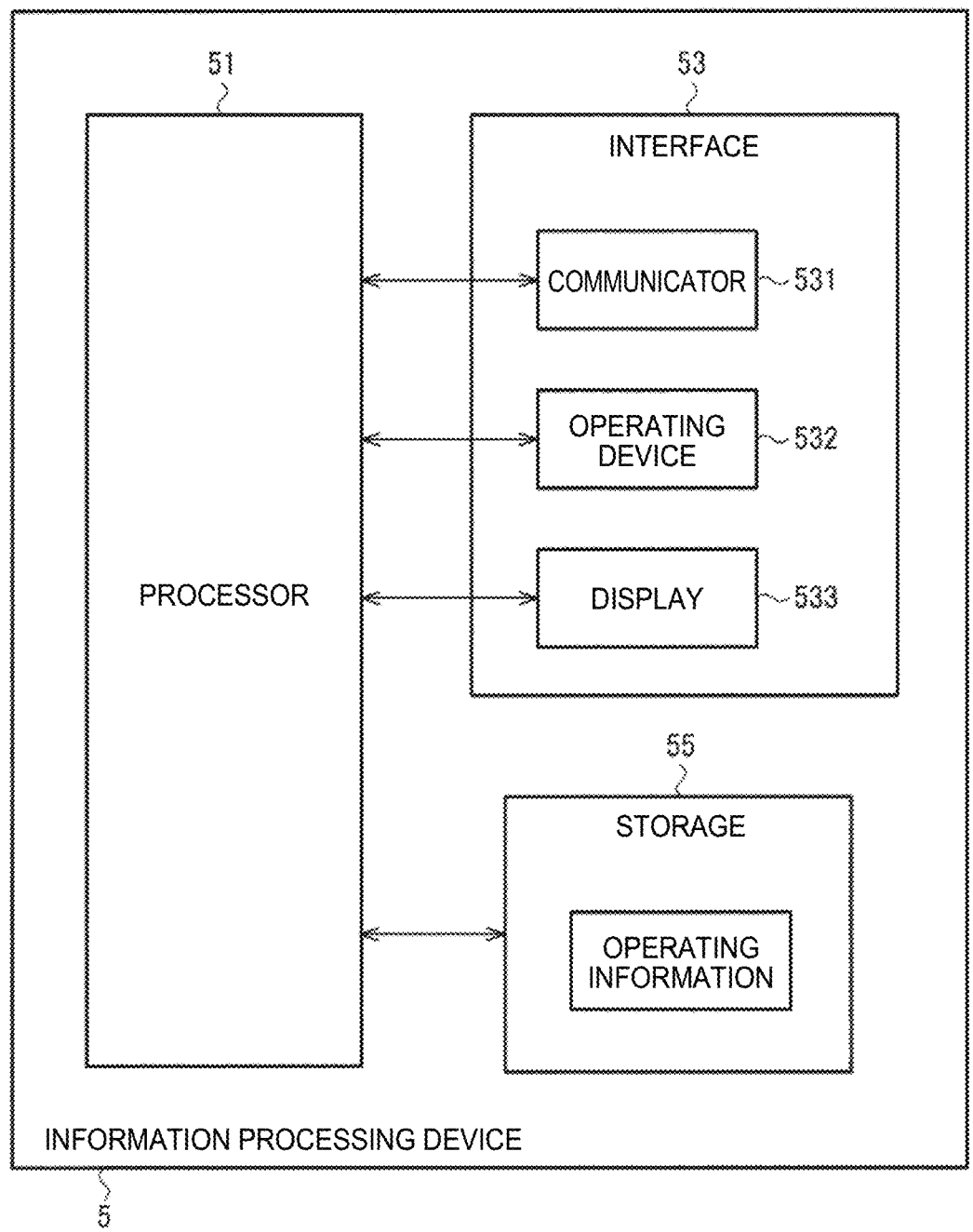
FIG. 3 is a block diagram illustrating the configuration of an information processing device.

FIG. 3 is a block diagram shows an example of the configuration of the information processing device 5. The information processing device 5 has a processor 51, interface 53, and storage 55, and executes an information relaying operation of accessing the storage 37 of each of multiple printers 3 to acquire the operating information, and sending the collected operating information to the server system 7. The processor 51 is a processor such as a CPU, and executes the information relaying operation using the interface 53 and storage 55.

The interface 53 includes a communicator 531, operating device 532, and display 533.

The communicator 531 connects to the LAN and Internet, communicates with each printer 3 through the LAN, and communicates with the server system 7 through the Internet.

The operating device 532 is embodied by a mouse, keyboard, or other device for receiving input from the user.

The display 533 comprises a display device for presenting information to the user.

Note that the operating device 532 and the display 533 may be integrated into a single device such as a touch panel.

The storage 55 may include storage media such as a HDD, ROM, or RAM, and stores the operating information the communicator 531 received from the printers 3.

Because the information processing device 5 acquires operating information from multiple printers 3, the storage 55 relationally stores printer 3 identification information (printer ID) with the status information and other information.

2.3 Server System

Figure 4:
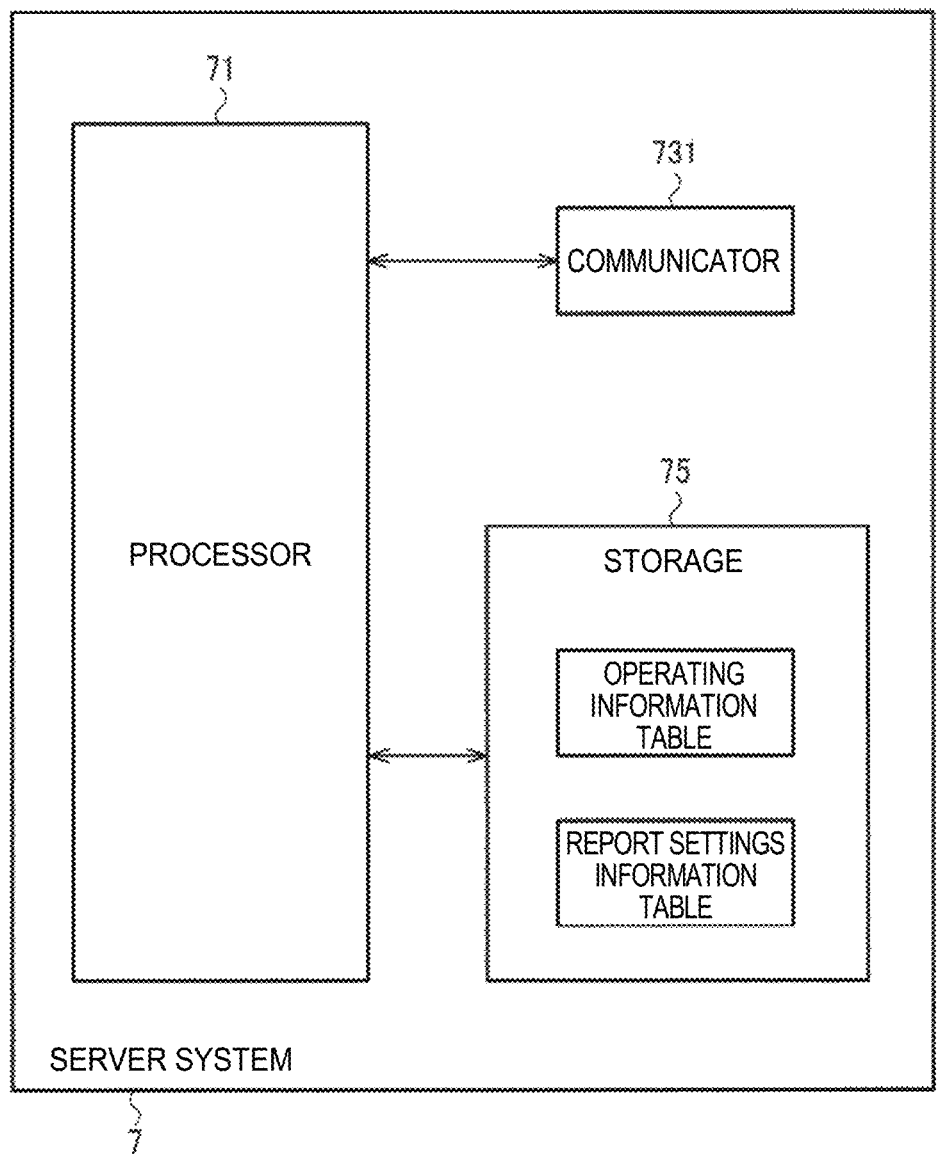
FIG. 4 is a block diagram illustrating the configuration of a server system.

FIG. 4 is a block diagram shows an example of the configuration of the server system 7.

The server system 7 includes a processor 71 (processor), communicator 731 (communication interface) and storage 75 (storage device, memory), receives the operating information collected by the information processing device 5, and sends the operating information to the terminal device 9. The function of the processor 71 is embodied by hardware such as a CPU, ASIC, or other processor, and a program, and the 71 executes specific operations in conjunction with the 731 and storage 75.

The communicator 731 connects to the Internet, and communicates through the Internet with the information processing device 5 and terminal device 9.

The server system 7 may also have an operating device and display not shown in the figures. The operating device may be embodied by a mouse, keyboard, or other device for receiving input from the user, and the display comprises a display device for presenting information to the user.

However, the server system 7 may also be configured without an operating device and display, and the server system 7 may be managed through an external device (such as a management terminal device). For example, the server system 7 may function as a web server, be operated using software (web browser) that runs on an external device, and display information on the display device of the external device.

The storage 75 may include storage media such as a HDD, ROM, or RAM. The storage 75 stores the operating information from the printers printer 3 and report settings information. The storage 75 may be configured as a database (more specifically, a relational database), or the storage 75 may store an operating information table and a report settings information table. The operating information table is a table that stores operating information. The report settings information table is a table used for push communication to the terminal devices 9.

Note that the server system 7 is not limited to comprising a single server. For example, the server system 7 may include a database server (storage 75) storing the operating information table, and an application server (processor 71 and part of the communicator 731) that exchanges information with the terminal device 9. Alternatively, the server system 7 may comprise server for load distribution, and a server for pushing communications to the terminal devices 9. Further alternatively, the server system 7 may be embodied by the distributed operation of multiple server devices such as a database server and an application server. Further alternatively, the servers configuring the server system 7 may be virtual servers. In this event, the virtual servers may run on the same server device (physical server), or on different physical servers. The server system 7 may also be embodied by dynamic scaling (such as dynamically changing the number of virtual servers) by monitoring the communication load, for example. In other words, the server system 7 according to this embodiment can be embodied in many different ways in terms of the number of physical servers, the number of virtual servers when virtual servers are used, and the relationship between virtual servers and physical servers.

2.4 Terminal Device

Figure 5:
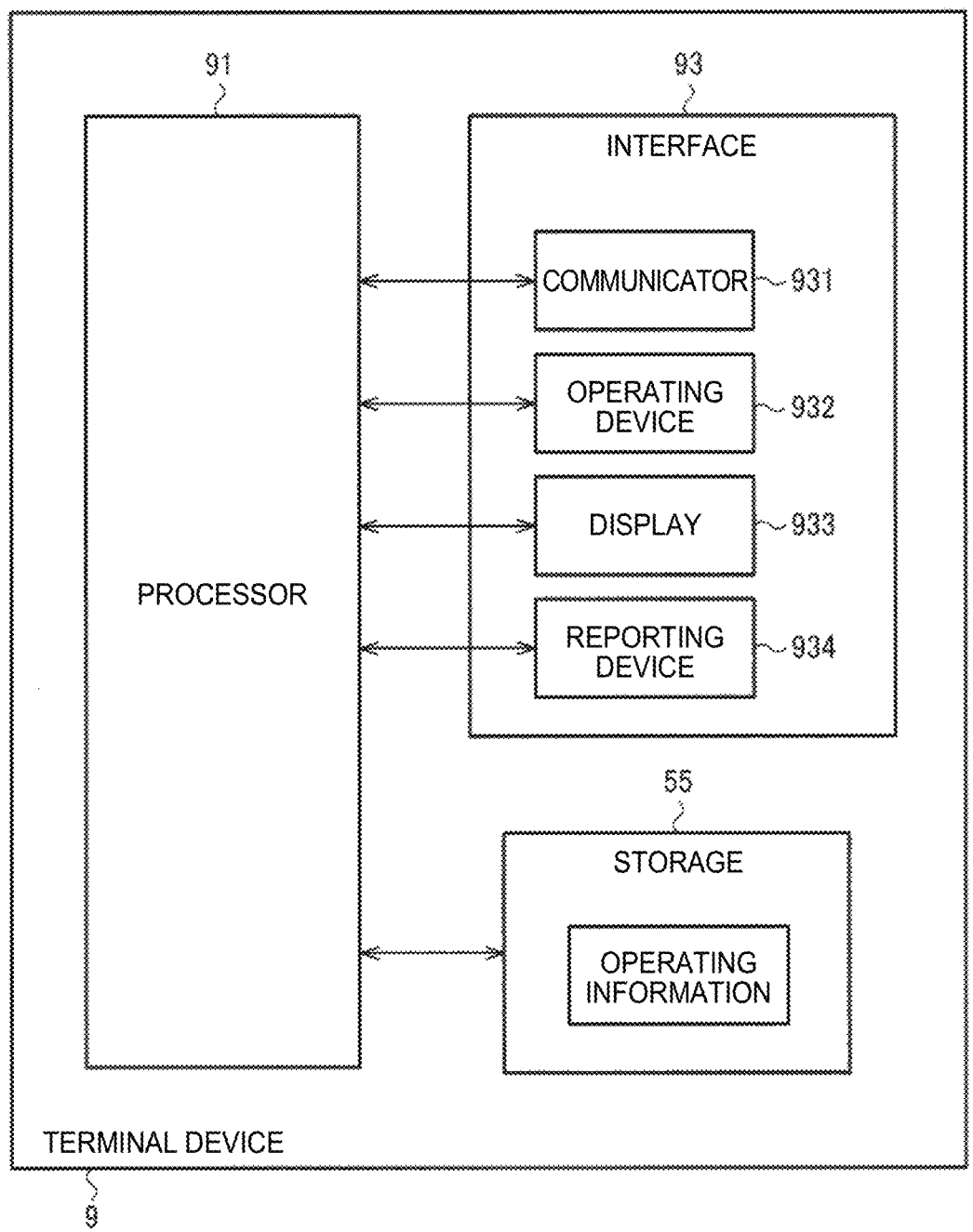
FIG. 5 is a block diagram illustrating the configuration of a terminal device.

FIG. 5 is a block diagram shows an example of the configuration of a terminal device 9.

Each terminal device 9 includes a processor 91 (processor), interface 93, and storage 95 (storage device, memory), and receives operating information gathered by the server system 7. The function of the processor 91 is embodied by hardware such as a CPU, ASIC, or other processor, and a program.

The interface 93 includes a communicator 931 (communication interface), operating device 932, display 933, and reporting device 934.

The communicator 931 connects to the Internet, and communicates through the Internet with the server system 7.

The operating device 932 is embodied by a mouse, keyboard, or other device for receiving input from the user.

The display 933 comprises a display device for presenting information to the user.

Note that the operating device 932 and the display 933 may be integrated into a single device such as a touch panel.

The reporting device 934 issues reports to the user. The reporting device 934 may be embodied by a speaker that reports by sound, a vibrator (vibrating motor) that reports by vibrations, or a desirable combination thereof.

The storage 95 may include storage media such as a HDD, ROM, or RAM. The storage 95 may store software (an application) for executing a process for acquiring operating information from the server system 7 and a display process, for example. The storage 95 also stores the operating information received from the server system 7.

3. Communicating Operating Information

A method for sending and receiving operating information between the devices shown in FIG. 1 to FIG. 5 is described next.

3.1 Communication Between a Printer and Information Processing Device

FIG. 6 shows an example of the storage format of operating information in the storage 37 of the printer 3. As shown in FIG. 6, the type of operating information and the address in memory are relationally stored in the storage 37, and each operating information entry stores the address of that type. For example, operating information v1 indicating the value of the time past since the device turned on is stored to address a1 corresponding to that type. However, the storage 37 may be configured otherwise, such as to relationally store the operating information to the time the operating information was updated (time stamp).

The processor 31 of the printer 3 and the printing mechanism 35 (sensor 352, counter 353) monitor the operating status regularly (more specifically, constantly), and when an operating status changes, the operating information is updated in the storage 37.

The processor 51 of the information processing device 5 (communicator 531) acquires the operating information by regularly polling one or multiple printers 3 connected to the LAN.

If the type of operating information and address are relationally stored in the storage 37 of the printer 3 as shown in FIG. 6, the processor 51 accesses the address corresponding to the operating information to acquire, and collects operating information stored at that address. For example, the processor 51 may acquire information that has changed since the last time the information was acquired. Alternatively, the processor 51 may determine the operating information to acquire for each printer 3 based on the type of printer 3 and the firmware version.

Figures 7, 8:
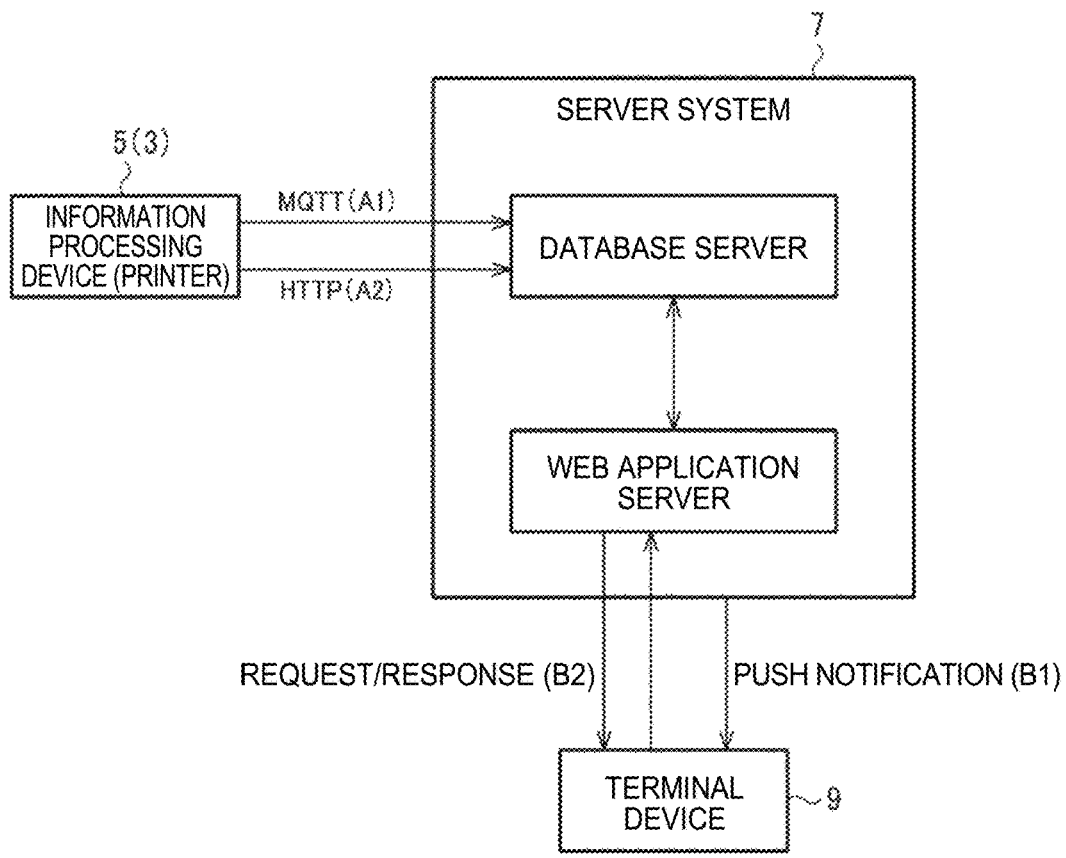
FIG. 7 shows an example of the data structure of operating information stored by an information processing device.
FIG. 8 illustrates communication between the information processing device, server system, and terminal device.

FIG. 7 schematically illustrates the storage format of operating information stored in the storage 55 of the information processing device 5. As shown in FIG. 7, operating information is stored in the storage 55 relationally to printer 3 identification information (a printer ID or serial number, for example) and acquisition time information. Note that while not shown in FIG. 7, the storage 55 stores combinations of the type of information (such as Y ink consumption) and a specific value (if ink consumption, the ejection count, volume, ratio, for example) as the operating information similarly to the example in FIG. 6.

3.2 Communication Between Information Processing Device and Server System

FIG. 8 schematically illustrates communication between the information processing device 5 (printer 3), server system 7, and terminal device 9.

The server system 7 receives and stores operating information transmitted from the information processing device 5 in the operating information table in the storage 75. The communicator 731 of the server system 7 receives the operating information from the information processing device 5 (or directly from the printer 3) by a specific communication process. For example, the communicator 731 may execute a first communication process that maintains the communication connection after opening a communication connection, and a second communication process that terminates the communication connection when information is received after opening the communication connection.

The first communication process may be a communication process using MQTT (Message Queueing Telemetry Transport), for example, and the second communication process may be a communication process that uses HTTP (Hypertext Transfer Protocol), for example.

Note that the communicator 731 (and communicator 531 and communicator 931) may also execute the first communication process and second communication process through a secure connection such as a SSL (Secure Sockets Layer) connection.

As indicated by A1 in FIG. 8, the communicator 731 receives first information, which is operating information with a high real-time rating, by the first communication process. An example first information is information indicating a status (status change) of the printer 3. When the printer 3 goes from a normal operating state (printing) to an alarm or error state, the user must go to the printer 3 and perform some task in order to continue or resume the job (printing).

An alarm state in this example is a state in which printing cannot continue (such as there being insufficient ink), and an error state is a state in which the printing operation stopped due to some problem. In another example, when a job on the printer 3 ends and the printer 3 goes from a normal operating state (printing) to an idle state (standby state), the printer 3 can be made to operate efficiently by the user going to the printer 3 and loading a new job. As a result, another example of operating information with a high real-time rating is a change in status from printing to a standby state.

As a result, information indicating a status change is preferably sent to the server system 7 (and terminal device 9) as soon as possible after the status change occurs on the printer 3. Therefore, when an event indicating a status change occurs, the communicator 531 of the information processing device 5 (or the communicator 331 of the printer 3) sends the operating information to the server system. 7 by MQTT triggered by the event (event-driven).

More specifically, when an event occurs, the communicator 531 (communicator 331) immediately (in real time) sends the operating information to the server system 7. As a result, the server system 7 can appropriately receive operating information with a high real-time rating.

FIG. 9 shows specific examples of first information in the operating information, and specific examples of events corresponding to the first information. In addition to status information, the first information includes remaining time information indicating how much time is left until a job ends, consumables information or remaining amount information related to consumables (fluid ink, toner, or paper or cloth print media), and information indicating the names of jobs the printer 3 is executing.

As shown in FIG. 9, the status information takes a value of Printing, Standby, Alarm, or Error. Printing indicates a normal printing operation state; Standby indicates an idle state; Alarm indicates an alarm state; and Error indicates an error state.

An event that triggers sending status information to the server system 7 is an event that changes the value of the status information. Note that the printer 3, information processing device 5, and server system 7 devices may manage as separate events changes to an Alarm or Error state, and changes to a Printing or Standby state. While the former are events indicating an error state in which printer 3 operation stopped or may stop, the latter are events indicating the start and end of a normal operation, that is, printing starting or ending.

The remaining time information is information indicating how much time remains until printing ends, such as information indicating the remaining time in hours and minutes. Instead of remaining time information, printing-completed time information indicating the time printing will end may be used as first information. Events triggering sending remaining time information to the server system 7 are events when the remaining time information changes. For example, the printer 3 and information processing device 5 executing a flushing operation during printing and causing the remaining time information to increase triggers an event.

Remaining amount information related to consumables indicates the remaining amount of fluid ink or toner, or the remaining amount of print media.

The remaining ink amount indicates a percentage where the volume of the ink tank is 100%, for example, and the unit is percentage (%).

The remaining amount of print media may be the number of sheets or the length (unit: meters) if roll paper is used.

Events triggering sending remaining consumables amount information to the server system 7 may be the remaining amount changing a specific amount (specific percentage, specific page count, specific length), or the remaining amount going below a specific threshold. In addition, the consumables information may be consumption information instead of remaining amount information.

The job name information may be the name of the file to be printed (such as the image file name). Events triggering sending a job name to the server system 7 include events indicating executing a new job. Events indicating executing a new job are the same as events indicating a change from Standby to Printing (start printing events), and may be managed by the printer 3. Job names are also not limited to the names of executing jobs, and may be extended to include the job names of a specific number of previously executed jobs (a job history).

Note that the communicator 531 (communicator 331) may also be configured to pick the information to send to the server system 7 depending on the type of first information. More specifically, the communicator 531 may be configured to not send information for a specific time (such as several minutes) after last sending information even if a new event occurs. This can reduce the communication load between the information processing device 5 (printer 3) and server system 7. For example, the communicator 731 of the server system 7 may immediately receive status information with a real time rating that is particularly high even among the first information after an event occurs, and set a limit on the reception frequency for other information.

Compared with the first information described above, second information resulting from specific counts, such as the number of rotations of rollers in the printing mechanism 35, the number of bidirectional passes the printhead has moved, and the number of cleaning operations, is useful for long term maintenance of the printer 3, but does not need reporting to the user within minutes after the count is increased. Therefore, as shown by A2 in FIG. 8, the second information is sent to the information processing device 5 by HTTP or similar protocol. Second information sent using HTTP is received less frequently than first information (received once a day, for example).

3.3 Communication Between Server System and Terminal Device

Multiple communication paths bet the server system 7 and terminal device 9 are conceivable. As shown in FIG. 8, B1, the communicator 731 of the server system 7 sends push notifications to the terminal device 9, and the terminal device 9 receives the push notifications by the communicator 931 and returns reports (alarms) by the reporting device 934. In other words, push notifications are communication processes in which the server system 7 sends operating information.

Information communicated by push notifications is first information with a particularly high real time rating. More specifically, of the information described above, changes in status information are sent to the terminal device 9 by push notifications. Note that information sent by push notifications is the status information after the status information changed. Alternatively, the push notification may send only information indicating there was a change in status information (such as an error occurred), and the specific status information may be sent by communication B2 described below.

Note that the server system 7 (processor 71) determines whether or not to send a push notification to the terminal device 9 based on the report settings information table in the storage 75. The report settings information table relationally stores identification information for the terminal device 9, identification information for the printer 3 being reported on, the reportable time band, and the reportable day of the week. This enables the server system 7 to send the appropriate information at the appropriate timing to the user by push notification. For example, if the company where a particular user works has multiple printers 3, the processor 71 (communicator 731) may send the information for only the printers managed by the particular user by push notifications, and not send the push notifications outside of the work hours of that user (such as during the night or holidays).

The priority of remaining time information, remaining consumables amount information, and job names is low compared with status information, and may be communicated in response to a request from the user (from the terminal device 9) without creating a problem.

Therefore, as shown in FIG. 8 B2, the communicator 931 of the terminal device 9 sends a request to the server system 7 (web application server), and in response to the request, the server system 7 returns operating information. This communication is handled by HTTP, and is executed when an application program (a smartphone application) starts on the terminal device 9, or when the user executes update operation. In other words, request/response communication indicated by B2 in FIG. 8 is a communication process driven from the terminal device 9 side (user side) to acquire operating information.

By the communication indicated by the B2, the terminal device 9 receives first information from the server system 7. In this way, information useful for remote monitoring of the printer 3 through the terminal device 9 can be provided to the user. Note that the communicator 731 of the server system 7 does not need to return all of the first information described above, and may send only part of the invention. For example, if the request from the terminal device 9 requests only some of the first information to be displayed, the communicator 731 of the server system 7 returns only the requested information.

In addition, when there is a request from the terminal device 9, the communicator 731 of the server system 7 also does not interfere with returning the second information as the response in communication by the B2 path.

4. Displaying and Updating Job Completion Time Information (Printing Completion Time Information)

A method of communicating with the printer 3 when displaying job completion time information on the terminal device 9 is described next.

4.1 First Embodiment

Figure 10:
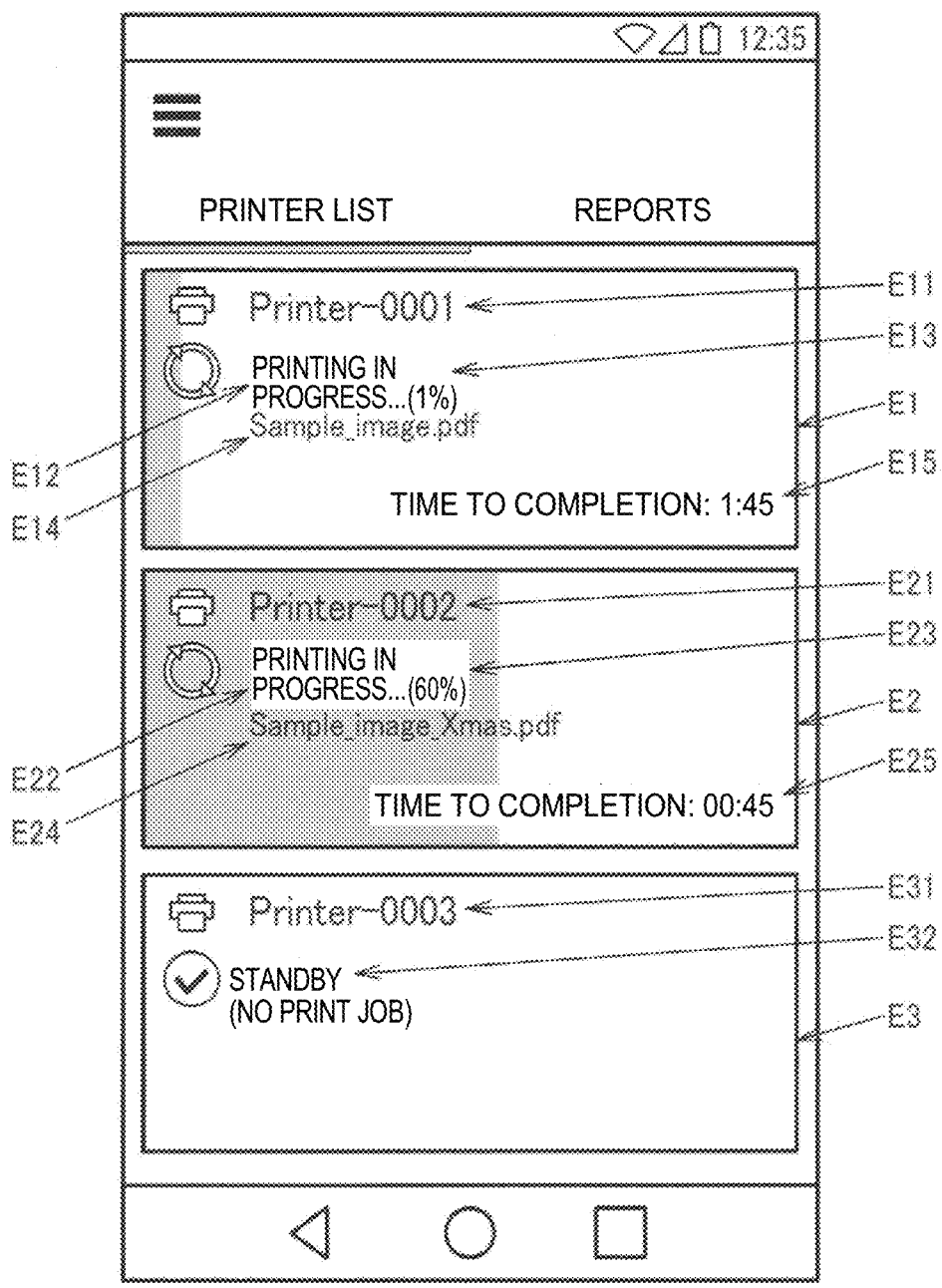
FIG. 10 shows an example of a display screen presenting a list of information for multiple printers.

FIG. 10 shows an example of a display screen presented on the display 933 of the terminal device 9.

The communicator 931 of the terminal device 9 receives printing time information for multiple printers 3 through the network, and the processor 91 processes displaying the printing time information for the multiple printers 3 in a single window on the display 933. More specifically, the processor 91 executes a process of displaying on the display 933 remaining time information indicating the time left until printing is completed by the multiple printers 3 in a single window. Note that this embodiment is not limited to displaying information for multiple printers 3, and the display 933 may display information for only one printer 3.

In the example in FIG. 10, the display 933 presents information for three printers 3. For example, pane E1 shows Printer-0001 (E11) as the name of the object printer 3 together with operating information including status information (E12), job progress information (E13), job name (E14), and remaining time information (E15). More specifically, the current status of the printer called Printer-0001 is Printing, and is executing a job of the job name Sample_image.pdf. In this example, the job name is the name of the file being printed. Where 100% indicates the complete job, the progress is 1%, and the time left until the job is completed is 1 hour 45 minutes.

Pane E2 of the display 933 shows the current status of the printer of printer name Printer-0002 is Printing, the printer is executing a job of the job name Sample_image_Xmas.pdf, the progress is 60%, and the time left until the job is completed is 45 minutes.

Pane E3 of the display 933 shows the current status of the printer of printer name Printer-0003 is Standby (idle state). Because Printer-0003 is idle, the job name, progress information, and printing completion time are not shown.

By using the display screen shown in FIG. 10, the operating status of multiple printers 3 can be presented to the user with a high degree of readability. More particularly, because remaining time information is displayed, the time remaining until printing is completed can be easily known even when displaying information for multiple printers 3. For example, from the screen shown in FIG. 10, the user can determine that in approximately 45 minutes, the user will need to return to the second printer (Printer-0002) and prepare to load the next job.

However, the remaining time information can be expected to decrease as time passes. As a result, as shown in FIG. 10, if the remaining time information has not changed after a period of time even though a remaining time of 1 hour 45 minutes was displayed at 12:35, the user may suspect something is wrong. As a result, the remaining time information presented in the display 933 preferably changes over time.

Figure 11:
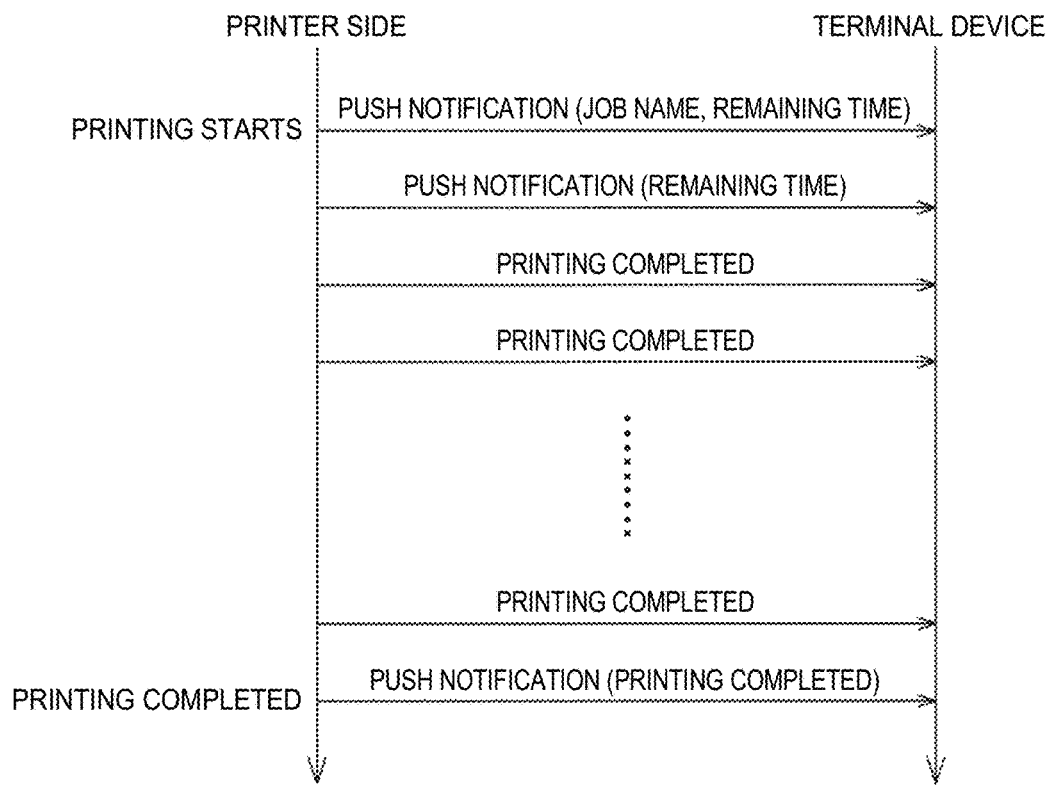
FIG. 11 shows an example of communication between a printer and a terminal device used for comparison.

FIG. 11 illustrates a method of updating the remaining time information. FIG. 11 illustrates communication between the printer 3 and terminal device 9 sides when an event occurs on the printer 3 side and a process is executed on the terminal device 9 side. The vertical axes in FIG. 11 indicate time. The information processing device 5 and server system 7 are included on the printer 3 side. For example, in a push notification shown in FIG. 11, information collected by the server system 7 from the printer 3 through the information processing device 5 is sent by the communicator 731 of the server system 7 to the terminal device 9. In other words, the 'printer 3 side' is used to clarify that an trigger for a push notification is an event that occurs on the printer 3, and transmission of information from the printer 3 to the terminal device 9 goes through at least the server system 7. This also applies to the operations shown in FIG. 12 to FIG. 15.

In the example in FIG. 11, when a start printing event occurs on the printer 3, the server system 7 receives the job name and expected remaining time information when the job starts from the printer 3 (information processing device 5) by an event-driven process. The server system 7 then sends the job name and remaining time information to the terminal device 9. As a result, the job name and remaining time information at the time printing starts can be displayed on the display 933 of the terminal device 9.

As described above with reference to FIG. 8, there are multiple possible communication paths between the server system 7 and terminal device 9 (B1 and B2 in this example). The only push notification from the server system 7 to the terminal device 9 is information indicating the start of printing, and the job name and remaining time information can be sent from the terminal device 9 as a response to the request. Alternatively, the non and remaining time information may be included in the push notification. To simplify the description using FIG. 11 to FIG. 15, the expressing sending remaining time information by push notification is used, and this applies to communication of remaining time information by path B1, as well as communication of remaining time information by path B2.

In the example in FIG. 11, updating the remaining time information displayed on the display 933 is triggered by a change in the remaining time, and the remaining time information is sent by push notification from the printer 3 side. For example, when the remaining time decreases by a specific time (such as 1 minute), remaining time information is sent from the printer 3 to the server system 7, and the remaining time information is sent by push notification from the server system 7 to the terminal device 9. As a result, the communicator 931 of the terminal device 9 can receive updated remaining time information at a specific interval. As a result, the display 933 can display highly accurate remaining time information until printing by the printer 3 is completed.

However, in the example in FIG. 11, communication between the printer 3 (or information processing device 5) and server system 7, and between the server system 7 and terminal device 9, occurs frequently. As a result, the network load is also high.

Figure 12:
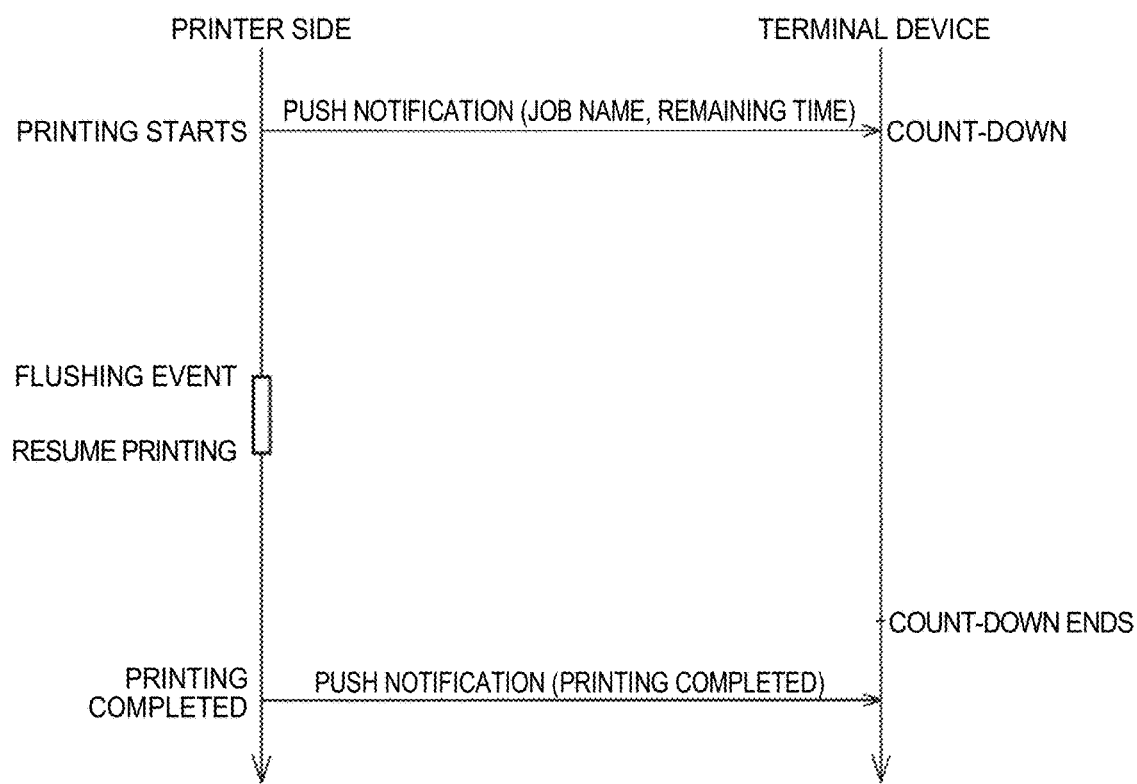
FIG. 12 shows another example of communication between a printer and a terminal device used for comparison.

FIG. 12 shows another example of updating the remaining time information. Triggered by a start printing event on the printer 3, the terminal device 9 receives the job name and remaining time information expected when printing starts as described in FIG. 11. In the method in FIG. 12, the processor 91 of the terminal device 9 executes a remaining time information count-down process based on transaction information from a clock circuit, and displays the remaining time information output from the count-down process on the display 933. In this example, the terminal device 9 has a real-time clock or other clock circuit, and the processor 91 executes the count-down process based on the time information (clock information) from the real-time clock. Note that the time information is not limited to information indicating the absolute time, and may be other information enabling measuring time (such as a time stamp). Alternatively, the processor 91 may acquire time information from the communicator 931 through the network NE2 (more specifically, the Internet), and execute the count-down process based on the received time information. In other words, the clock may be included in the terminal device 9, or an external device.

In this configuration, communication related to the remaining time information is limited to when printing starts, and the network load is smaller than in the example in FIG. 11. Because a great difference in precision is not expected between the clock circuit used by the printer 3 and the timekeeping means of the terminal device 9, if the printer 3 prints as expected when printing starts, the terminal device 9 can calculate and display the remaining time information precisely by the count-down process.

However, events may that create a difference to the expected remaining time information can occur on the printer 3. For example, because dot dropout and other problems can occur when nozzles become clogged in an inkjet printer, print quality drops and flushing is required to clear the nozzles. Flushing is a process of moving the printhead of the printer 3 to a cleaning position outside of the print area and ejecting a specific amount of ink from the nozzles at the cleaning position.

Because flushing and printing cannot execute simultaneously, the printer 3 must interrupt printing when flushing is required and then resume printing after flushing is completed as indicated in FIG. 12. In other words, flushing makes the remaining time information until printing ends longer than initially expected. As shown in FIG. 12, if the remaining time information is updated based only on the count-down process of the terminal device 9, the delay of the printing operation due to flushing by the printer 3 will not be reflected in the information displayed on the display 933 of the terminal device 9. As a result, the count-down by the terminal device 9 may end (the remaining time is 0) even though the printer 3 has not finished printing.

Therefore, remaining time information correction information is sent from the printer 3 side to the terminal device 9 triggered by a specific even occurring on the printer 3 (more broadly, the device for which operating information is monitored). More specifically, remaining time information correction information is sent from the printer 3 through the server system 7 to the terminal device 9.

The server system 7 according to this embodiment is a server system that gathers operating information for at least one monitored device through a network (NE1, NE2), and includes a communicator 731 that receives from the monitored device job completion time information indicating the expected time when a job will be completed on the monitored device, and processor 71 that processes communication by the communicator 731.

The processor 71 controls the communicator 731 to send job completion time information received from the monitored device to the terminal device 9 that displays the job completion time information. When a specific event causing a change in the time until job completion occurs (a specific event producing a difference between the expected job completion time information and the actual time when the job will be completed) on the monitored device, the processor 71 sends the job completion time information to the terminal device 9 by push notification. This push notification is a form of communication in which the sending side sends information without receiving a request from the receiving side. If correction information is sent from the server system 7 to the terminal device 9, push notification of the correction information is originated by the server system 7 simply sending the correction information to the terminal device 9. Note that push notifications from the monitored device side (printer 3 side) include push notifications from the monitored device to the server system 7, and push notifications from the information processing device 5 to the server system 7.

The terminal device 9 according to this embodiment is a monitored device communicatively connected through a network NE2 to a server system 7 that collects operating information about at least one monitored device, and has a processor 91 that executes a count-down process counting down the remaining time of a job running on the monitored device, and a communicator 931 that receives correction information correcting the remaining time information when a specific event causing a change in the time until job completion occurs on the monitored device. The communicator 931 receives the correction information by push notification from the monitored device through the network, and the processor 91, based on the received correction information, corrects the remaining time information.

The job completion time information is remaining time information indicating the time remaining until job completion. However, as described below in another example, the job completion time information may be time of completion information indicating the time the job is expected to be completed. If the monitored device is a printer 3, the job is more specifically a printing operation, and the job completion time information is printing completed information indicating the time left until printing ends.

Change in the time to job completion indicates a delay or an advance in job progress. More specifically, if a change in the time to job completion occurs, the previously expected job completion time information may become disconnected from (different from) the actual time until the job is completed. Note that if remaining time information is used as the job completion time information, and the remaining time decreases 5 minutes when the clock counts down 5 minutes, the change in the remaining time changes as expected, and this change is therefore not considered to be a change in the time until job completion as used in this embodiment of the invention.

An object of this embodiment of the invention is to display accurate job completion time information on the terminal device 9. As a result, the terminal device 9 must be able to acquire job completion time information after a specific event occurs. The terminal device 9 may acquire the new job completion time information by various methods.

Because the monitored device (printer 3) is the device where the event occurs and the device executing the job, the monitored device (printer 3) can accurately generate the new job completion time information. As a result, the printer 3 can generate the job completion time information, and send the job completion time information through the server system 7 to the terminal device 9. In this case, the correction information sent from the server system 7 to the terminal device 9 is the new job completion time information. In other words, the communicator 731 of the server system 7 receives the new job completion time information expected after the specific event occurs directly from the monitored device (printer 3) or through another device (the information processing device 5), and the processor 71 pushes the new expected job completion time information as the correction information to the terminal device 9.

However, by using information indicating the time difference of the job completion time information (referred to below as time difference information) caused by a specific event, new job completion time information can be calculated. Calculating the new job completion time information based on the time difference information may be done by the printer 3, by the information processing device 5, by the server system 7, or by the terminal device 9.

Calculation by the printer 3 is an example of the printer 3 calculating and outputting new job completion time information.

When calculated by the information processing device 5 or the server system 7, the server system 7 sends the new job completion time information resulting from the calculation as the correction information to the terminal device 9.

When calculated by the terminal device 9, the server system 7 sends the time difference information as the correction information to the terminal device 9.

The time difference information may be information acquired by the printer 3 each time a specific event occurs. Alternatively, the time difference information may be information reporting the occurrence and the end of an event. In this case, the specific value of the time difference is calculated by the device that received the information reporting the occurrence and the end of an event (information processing device 5, or server system 7, or terminal device 9). An example of the server system 7 sending information reporting the occurrence and the end of an event as correction information to the terminal device 9 is described below in the second embodiment.

In other words, the communicator 731 of the server system 7 receives from the monitored device (printer 3) either directly or through another device (information processing device 5) time difference information indicating the difference to the job completion time information caused by the specific event. The processor 71 pushes the time difference information as correction information to the terminal device 9, or pushes the new job completion time information based on the time difference information as correction information to the terminal device 9.

Note that when there is a correlation between the type of event and the time difference caused by the event, the time difference information may be determined from the event type. In this case, the process of identifying the time difference information from the information indicating the event type may be executed by the printer 3, executed by the information processing device 5, executed by the server system 7, or executed by the terminal device 9.

When this identification process is executed by the printer 3, the printer 3 may output the acquired time difference information, or may generate job completion time information from the time difference information and output the job completion time information.

When the time difference information identification process is executed by the information processing device 5 or server system 7, the server system 7 sends the time difference information resulting from the process as the correction information to the terminal device 9.

Alternatively the information processing device 5 or server system 7 may generate the job completion time information based on the time difference information in addition to executing the time difference information identification process, and the server system 7 then send the resulting job completion time information as the correction information to the terminal device 9.

When the time difference information identification process is executed by the terminal device 9, the server system 7 sends information indicating the event type as the correction information to the terminal device 9. An example of the server system 7 sending information indicating the event type as the correction information to the terminal device 9 is described below in the third embodiment.

Figure 13:
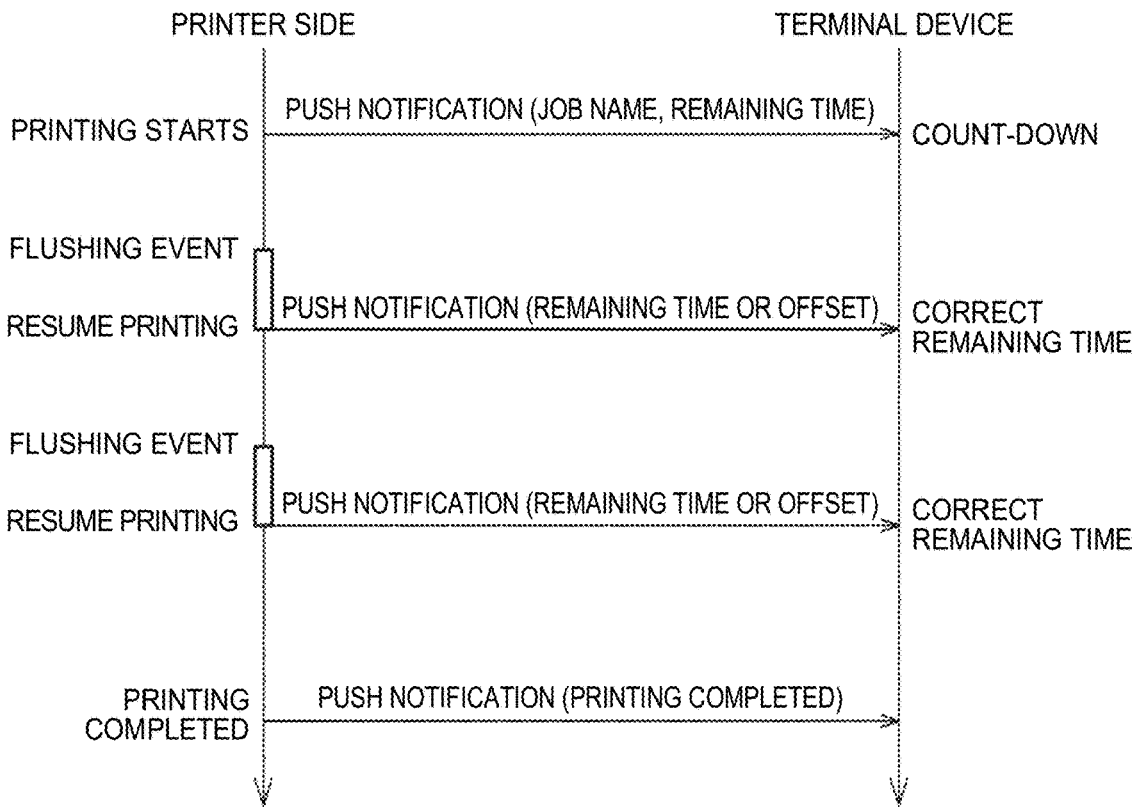
FIG. 13 illustrates a method of communication according to a first embodiment of the invention.

FIG. 13 illustrates communication between the printer 3 side and the terminal device 9 according to the method of this example. This method is the same as shown in FIG. 12 in that receiving the job name and remaining time information expected when printing starts is triggered by a start printing event on the printer 3, and the count-down process of the terminal device 9 from the remaining time information starts when printing starts. By running the count-down process on the terminal device 9 side, the frequency of communication is reduced and the network load can be reduced.

In the method according to this example, when an event such as flushing occurs on the printer 3, the event triggers sending correction information to the terminal device 9. The correction information in this example is information based on the job completion time information the communicator 731 of the server system. 7 received from the monitored device (printer 3) in response to the specific event occurring.

The monitored device can acquire information (such as the content of the event, and the time required for the event to execute) about events that caused a change in the time to job completion. In other words, by using information from the monitored device, the remaining time information can be accurately corrected by the terminal device 9.

More specifically, the information based on the job completion time information is the new job completion time information expected after the specific event occurs, or time difference information indicating the difference in the job completion time information caused by the specific event.

Note that the new expected job completion time information is predicted by the monitored device on the side where the specific event occurred, and indicates the job completion time information determined at a time after the job completion time information that was sent to the terminal device 9. More specifically, the new expected job completion time information corresponds to the job completion time information determined by the processor of the monitored device (processor 31) or the processor 51 of the information processing device 5 (printer driver) after when the specific event occurred. The time difference information is information indicating time difference (difference) between the job completion time information and the time when the job will actually be completed due to the change in the time to the job completion resulting from the event.

In the example in FIG. 13, when the printer 3 resumes printing after flushing is completed, the remaining time information can be determined when printing resumes, and the time lost due to the flushing operation can be calculated. If the correction information is the new remaining time information, the processor 91 of the terminal device 9 executes, as a correction process, a process of replacing the stored remaining time information with the new remaining time information received from the server system 7. If the correction information is the time difference information, the processor 91 of the terminal device 9 executes, as the correction process, a process of adding (or subtracting) the time difference corresponding to the time difference information received from the server system 7 to the remaining time information that is stored.

In the method according to this example, correction information is sent from the printer 3 side to the terminal device 9 triggered by the occurrence of a specific event. As a result, a disconnect between the remaining time information on the terminal device 9 and the actual state of printing by the printer 3 (job progress) can be suppressed, and the appropriate information can be provided to the user of the terminal device 9.

When there is a low probability of a disconnect between the remaining time information and the actual remaining time, the frequency of communication can be reduced by the terminal device 9 executing the remaining time information count-down process. More specifically, in this embodiment of the invention, the appropriate job completion time information can be displayed by the terminal device 9 by efficient communication.

Note that specific events producing a difference in the expected job completion time information are not limited to flushing events, and extend to a wide range of events that can result in a delay or advancement of job progress.

For example, if the monitored device is a printer 3, such specific events may include at least one of a cleaning operation event, a print medium jam event, a no-paper event, a no-ink event, or an event in which movement of the ink head is less than a specific amount.

A cleaning operation may be narrowly defined as a flushing event, but may include cleaning operations such as wiping the nozzle face with a rubber wiper, for example.

If the print medium is paper or cloth to print on, a print medium jam event means an event in which the print medium becomes stuck inside the printer 3, or cannot be supplied (fed, conveyed) or discharged (ejected).

A no-paper event means an event in which the end of the print medium has been reached, and print media cannot be supplied to the printer 3 for printing.

A no-ink event means an event in which the amount of remaining ink (including fluid ink and toner) drops to a level at which printing cannot continue.

All such events are events that cause a job (printing operation) delay.

Such specific events also include events in which the movement of the ink head is low. In an ink head control method known as logical seek, ink head movement and ink ejection are omitted in areas where the color of the paper remains the same (such as white). Because the amount of movement decreases when this happens compared with moving the ink head a previously set amount (such as from one end to the other end of the printable area), the job (printing operation) advances rapidly. In other words, because the remaining time becomes shorter than expected, by including such events in the specific events, the remaining time information can be accurately displayed on the terminal device 9.

4.2 Second Embodiment

Figure 14:
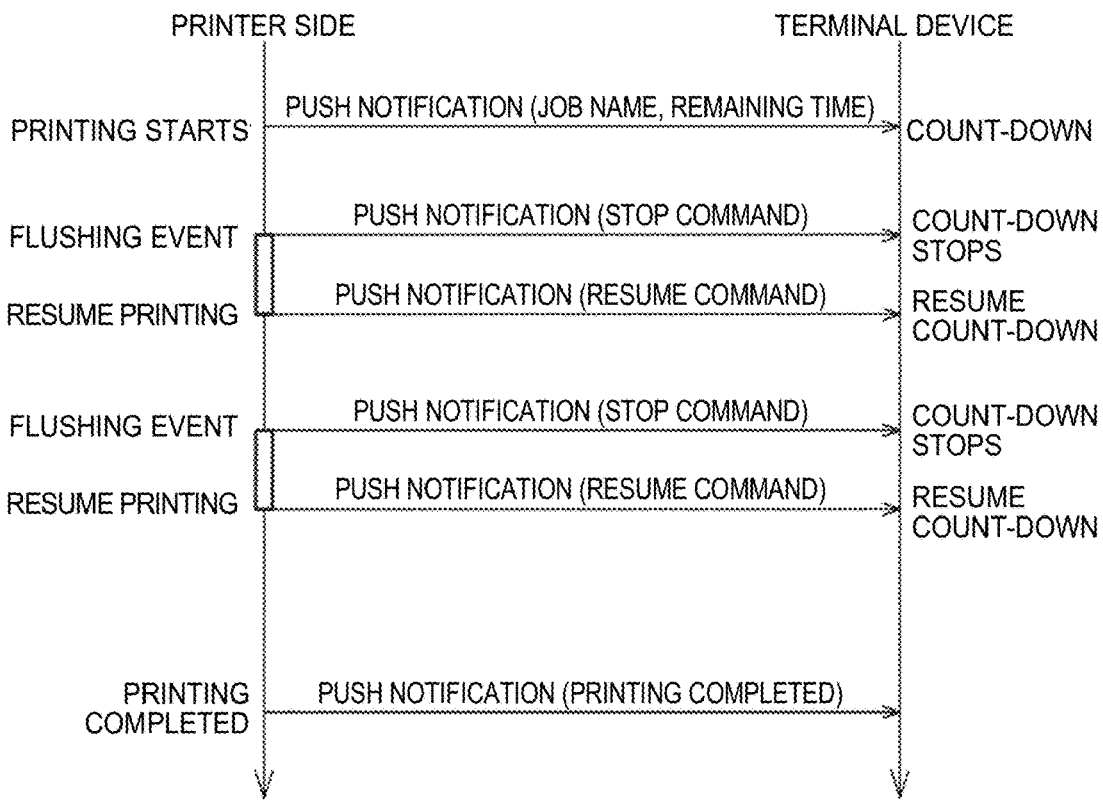
FIG. 14 illustrates a method of communication according to a second embodiment of the invention.

FIG. 14 shows an example of communication between the printer 3 side and the terminal device 9 in a second embodiment of the invention. This embodiment is the same as the first embodiment in that receiving the job name and remaining time information expected when printing starts is triggered by a start printing event on the printer 3, and the count-down process of the terminal device 9 from the remaining time information starts when printing starts.

As when a flushing event occurs as described above, when a specific event such as described above occurs, the job (printing operation) stops when the event occurs and resumes when the event ends. In addition to jobs not executing during specific events when this happens, job progress also stops and the remaining time does not decrease.

Therefore, the job completion time information is the remaining time to job completion, and when the remaining time information count-down process runs on the terminal device 9, the communicator 731 of the server system 7 sends correction information including a command to stop the count-down process of the terminal device 9 is sent to the terminal device 9 by push notification as shown in FIG. 14.

Because the count-down process can therefore be stopped on the terminal device 9 while job progress on the printer 3 is stopped, disconnection of the actual progress on the printer 3 from the remaining time information displayed by the terminal device 9 during the event can be suppressed.

When the specific event ends, the processor 91 of the terminal device 9 resumes the count-down process. More specifically, the correction information in this embodiment includes first report information corresponding to occurrence of a specific event, and second report information corresponding to job resumption. As shown in FIG. 14, the processor 91 stops the count-down process based on the first report information, and resumes the count-down process based on the second report information.

Note that the second report information may be only information indicating resuming the job (count-down process resume command), or job completion time information at the time the job resumes (remaining time information or time difference information).

If the second report information is information indicating resuming the job, the processor 91 of the terminal device 9 can simply resume the count-down process from the remaining time information when the count-down process stopped, and control is simple. If the second report information is job completion time information at the time the job resumes, the processor 91 of the terminal device 9 determines the remaining time information when the job resumes based on the received job completion time information, and then resumes the count-down process from that remaining time information. In this case, a more accurate correction process can execute compared with when the count-down process resumes from the remaining time information when the process stopped.

In either case, a disassociation between the actual progress of the job on the printer 3 during the event, and the remaining time information displayed on the terminal device 9, can be suppressed, and the count-down process can resume appropriately when the event ends.

Furthermore, because the method of the first embodiment executes the correction process at a single timing, the correction process changes the displayed remaining time information abruptly, which could confuse the user. In this respect, the change in the remaining time information resulting from the correction process can be reduced in this embodiment because the correction process is a two step process of stopping and then resuming the count-down process.

4.3 Third Embodiment

FIG. 1415 shows an example of communication between the printer 3 side and the terminal device 9 in a third embodiment of the invention. Communication when printing starts is the same as in the first and second embodiments.

When a flushing event such as described above will occur is not easy to predict, but the specific procedure of a single flushing event can be known based on the model of printer 3, firmware version, and user settings. As a result, when a flushing event occurs, how much job progress will be delayed by the event can be predicted with a high degree of accuracy.

The correction information in this embodiment of the invention is information indicating the event type of the specific event. Using the example of a printer 3, information enabling identifying the content of the specific event, such as a flushing event or other cleaning event, is used as the correction information. Depending on the model of printer 3, multiple different cleaning operations requiring different amounts of time, such as flushing, normal cleaning, and powerful cleaning, may be executed, and the correction information is information enabling identifying the specific operation.

Figure 15:
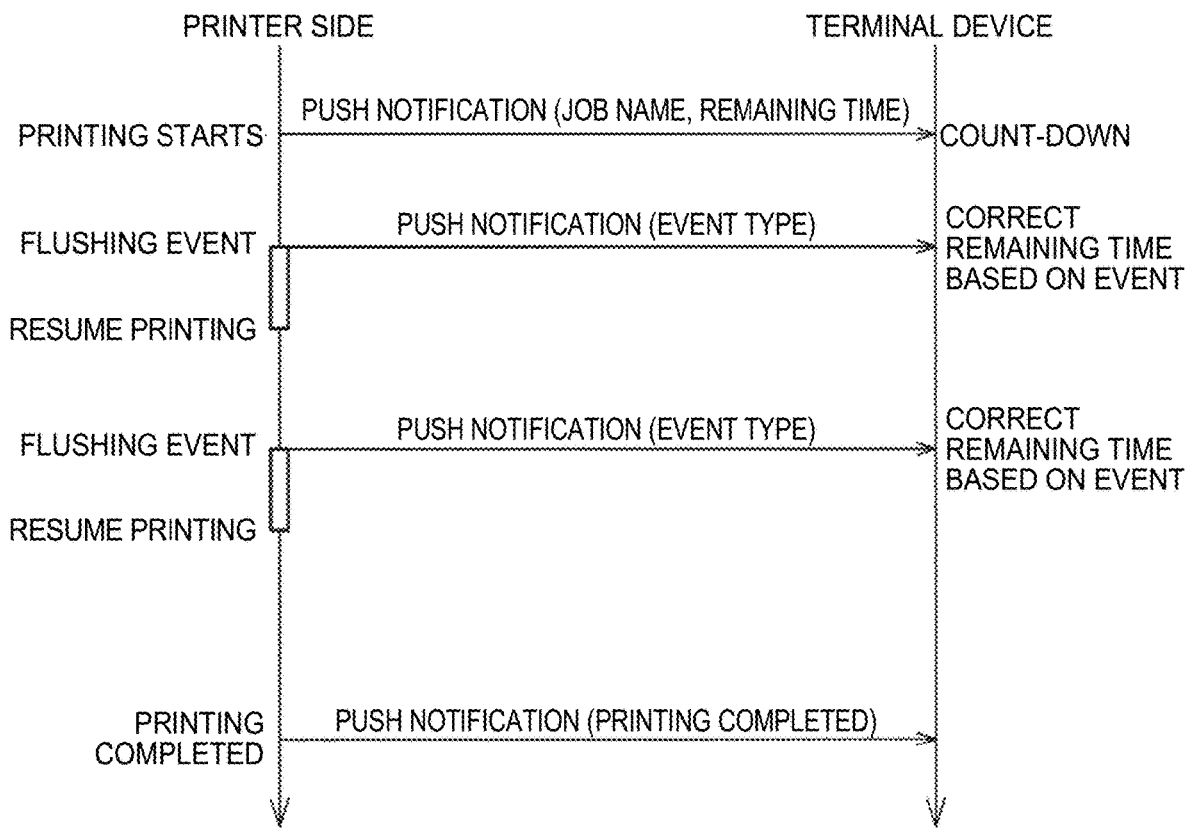
FIG. 15 illustrates a method of communication according to a third embodiment of the invention.

As shown in FIG. 15, the processor 91 of the terminal device 9 executes a process correcting the remaining time information based on time difference information corresponding to the event type of the specific event. For example, the storage 95 of the terminal device 9 stores a table relating event type to event execution time (time difference information), and the processor 91 executes the correction process based on the event type information received from the server system 7 and the table.

More specifically, instead of being acquired by actually measuring the event status on the printer 3 side as in the first embodiment (FIG. 13), the time difference information in this embodiment is information previously set according to the event type. Note that FIG. 15 shows an example of a push notification from the printer 3 side when the event occurs, but other methods are also conceivable, such as sending a push notification when the event ends (when the job resumes).

Note that in this embodiment of the invention the server system 7 receives information identifying the event type, and sends information indicating the event type by push notification to the terminal device 9. However, as described above, the process determining the time difference information or job completion time information based on the event type may be executed by the server system 7. The communicator 731 of the server system 7 receives information indicating the event type of a specific event from the monitored device either directly or through another device (information processing device 5). As described in the foregoing embodiments, the processor 71 of the server system 7 sends information indicating the event type as correction information to the terminal device 9 by push notification. However, the invention is not so limited, and the processor 71, based on information indicating the event type, may identify the time difference information and send the resulting time difference information as correction information by push notification to the terminal device 9. Alternatively, the processor 71 may send new job completion time information obtained based on the time difference information as the correction information to the terminal device 9 by push notification.

When information indicating an event type is received from the printer 3 or the information processing device 5, push notification can be sent to the terminal device 9 in various ways. Note that the method of this embodiment enables push notifications when an event occurs as shown in FIG. 15, but sending a push notification when an event ends (when a job resumes) as shown in FIG. 13 is not limited.

In addition, the server system 7 may change the type of push notification according to the event type. For example, when information indicating an event type whereby the execution time of the event can be estimated, such as a flushing event, the processor 71 sends time difference information when the event starts to the communicator 731 by push notification. In this case, the object of the push notification may be the information indicating the event type, or job completion time information.

However, if information indicating an event type that does not enable previously determining the execution time is received, the processor 71 sends time difference information by push notification to the communicator 731 when the event ends. More specifically, by receiving information indicating the event end from the printer 3 (information processing device 5) when the event ends, or time difference information, the communicator 731 of the server system. 7 notifies the terminal device 9 by push notification. In this case, the object of the push notification may be the job completion time information.

This configuration enables sending push notifications to the terminal device 9 at the appropriate timing corresponding to the event type.

4.4 Other Embodiments

The invention can be modified in many ways such as described below.

Figure 16:
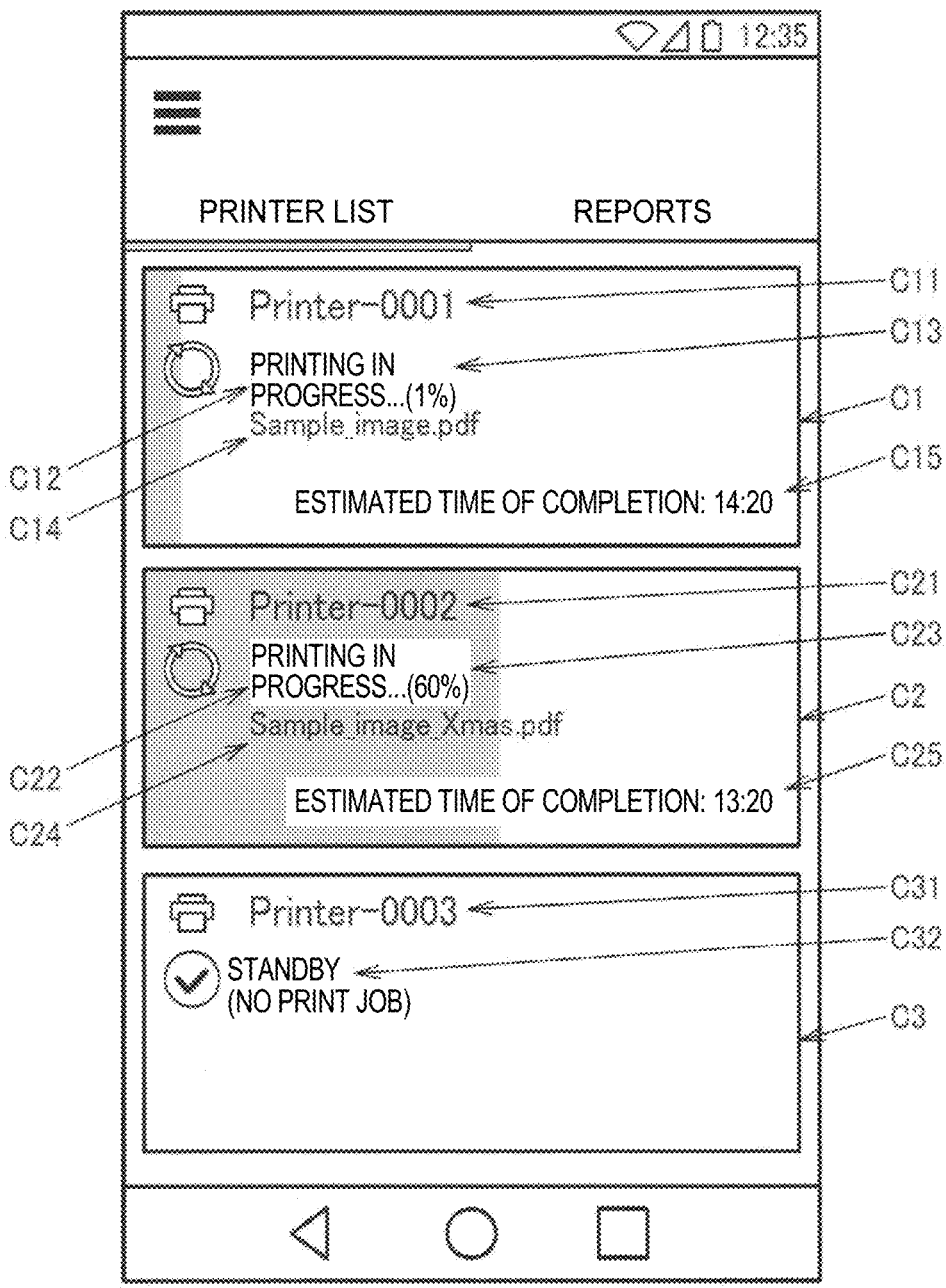
FIG. 16 shows another example of a display screen presenting a list of information for multiple printers.

FIG. 16 shows another example of a display screen presented on the display 933 of the terminal device 9.

The communicator 931 of the terminal device 9 receives printing time information for multiple printers 3 through the network NE2, and the processor 91 processes displaying the printing completion time for the multiple printers 3 in a single window on the display 933.

In the example in FIG. 16, the display 933 presents information for three printers 3 similarly to the example in FIG. 10. Pane E1 in FIG. 10 shows the remaining time information (E15) for Printer-0001, but panel C1 in the example in FIG. 16 shows 14:20 (C15) as the estimated time printing will be completed. The other items C11 to C14 in pane C1 are the same as items E11 to E14 in FIG. 10. Pane C2 for Printer-0002 is the same, showing 13:20 (C25) as the printing completion time instead of showing the remaining time information.

More specifically, the job completion time information (printing completion time information) described above is not limited to the remaining time information of the job, and may be job completion time information (printing completion time). When completion time information is used, the completion time information does not change with the passage of time unless a specific event that creates a difference occurs. Therefore, there is no need for the processor 91 of the terminal device 9 to run a count-down process.

As in the first embodiment (FIG. 13) and third embodiment (FIG. 15), when correction information is received once for a single event, the processor 91 determines the new completion time information based on the received correction information, and processes displaying the resulting completion time information.

This embodiment and the second embodiment can also be combined. When job execution is stopped due to a specific event, the job completion time may be expected to be delayed as time passes. For example, if the printing completion time is estimated to be 14:20, and the job is delayed 5 minutes by the specific event, the printing completion time is expected to change to 14:25.

The correction information in this case includes the first report information indicating a specific event occurred, and second report information indicating the job resumed. The processor 91 starts a count-up process based on the first report information, and stops the count-up process based on the second report information.

The method of the embodiment described above can be applied to an operating information collection system 1 including the foregoing terminal device 9 and server system 7 as shown in FIG. 1.

Part or most of the processes of the server system 7 and terminal device 9 in the embodiment described above may be embodied as a program. In this case, the server system 7 and terminal device 9 of the foregoing embodiments are embodied by a CPU or other processor running the program. More specifically, a program stored to a non-transitory data storage medium is read, and the CPU or other process executes the program that was read.

The data storage medium (computer-readable medium) stores a program and data, and the function of the data storage medium can be achieved by optical disc media (such as DVD or CD media), hard disk drive, or memory device (such as a memory card or ROM). A CPU or other processor executes the processes of the embodiments based on a program (data) stored on a storage medium. In other words, a program (a program causing a computer to execute the processes of the parts) causing a computer (a device having an operating device, processor, storage, and output means) to function as the parts of the invention is stored on a data storage medium.

The server system 7, terminal device 9, and other elements of the foregoing embodiments may include a processor and memory. The processor may comprise the functions of individual parts embodied by individual hardware components, or the functions of individual parts embodied by a single hardware component. For example, the processor may include hardware, and the hardware may include at least one of a circuit for processing digital signals, and a circuit for processing analog signals.

For example, the processor may be configured with one or multiple circuit devices (such as IC chips), or one or more circuit elements (such as resistors or capacitors), mounted on a circuit board. The processor may be a CPU, for example. However, the processor is not limited to a CPU, and a GPU (Graphics Processing Unit), DSP (Digital Signal Processor), or other type of processor can be used. The processor may also be a hardware circuit incorporating an ASIC. The processor may also include an analog circuit or filter circuit for processing analog signals.

The memory may be semiconductor memory such as SRAM or DRAM, or a register, a magnetic storage device such as a hard disk drive, or an optical storage device such as an optical disc drive. For example, functions (communication, processing) of the server system 7 and terminal device 9 can be executed by the memory storing computer-readable commands, and the commands being executed by a processor.

Commands as used herein may be commands in a command set used to write a program, or instructions specifying an operation for a hardware circuit of a processor.

The method of the foregoing embodiments is an operating method of a server system 7 that collects operating information of at least one monitored device through a network, and can be applied as an operating method of a server system that receives from a monitored device job completion time information indicating the time a job run by the monitored device is expected (predicted) to end; sends job completion time information received from the monitored device to a terminal device 9 that displays job completion time information; and when a specific event that causes the time to job completion to change occurs on the monitored device, sends correction information for the job completion time information to the terminal device 9 by push notification.

A method of the foregoing embodiments is also an operating method of a terminal device 9 communicatively connected through a network to a server system 7 that collects operating information of at least one monitored device, and can be applied to an operating method of a terminal device 9 that applies a count-down process to remaining time information for a job on a monitored device; when a specific event that causes the time to job completion to change occurs on the monitored device, receives correction information for the job completion time information from the monitored device by push notification; and corrects the remaining time information based on the received correction information.

Embodiments and examples of the present invention are described above, but the invention is not limited to those embodiments and examples and in application the described elements can be formed and embodied in many ways without departing from the scope of the invention. The invention can also be embodied in many ways by desirably combining multiple components described in the foregoing embodiments and examples. For example, some components elements may be omitted from all of the elements described in the configurations of the foregoing embodiments and examples. In addition, components described in different embodiments and examples described above may be desirably combined in different ways. Furthermore, terminology used together with different terminology of the same broad or same definition used at least once in the foregoing description or accompanying figures may be substituted for different terminology anywhere else in the description or figures. In this way, various modifications and applications are possible without departing from the scope of the invention.

The entire disclosure of Japanese Patent Application No: 2017-150127, filed Aug. 2, 2017 and 2018-081101, filed Apr. 20, 2018 are expressly incorporated by reference herein.

What is claimed is:

1. A server system configured to collect operating information of a monitored device through a network, the server system comprising:
a communicator configured to receive, from the monitored device, operating information including at least job completion time information indicating an expected completion time of a job that is being performed on the monitored device; and
a processor configured to control the communicator and cause the communicator to perform the following:
send, to a terminal device configured to display the job completion time information, the job completion time information received from the monitored device, and
when a specific event occurs after the job has started and before the job is completed at the monitored device, the specific event causing a change of the expected job completion time,
receive a notification related to the specific event from the monitored device directly or through another device, and
send correction information related to the change of the expected job completion time to the terminal device by a push notification,
wherein when a remaining time information countdown process is executed on the terminal device, the correction information includes an instruction to stop the count-down process on the terminal device to the terminal device by push notification.

2. The server system described in claim 1, wherein:
the correction information is information generated by the processor based on the notification received from the monitored device in response to the specific event.

3. The server system described in claim 2, wherein:
information generated by the processor based on the notification is new job completion time information expected after the specific event is completed, or is time difference information indicating a difference due to the specific event to the job completion time information.

4. The server system described in claim 1, wherein:
the job completion time information includes remaining time information to job completion.

5. The server system described in claim 1, wherein:
the communicator receives from the monitored device, directly or through another device, the job completion time information newly expected after the specific event has completed; and
the processor sends the newly expected job completion time information as the correction information to the terminal device by push notification.

6. The server system described in claim 1, wherein:
the notification received, from the monitored device, directly or through another device, includes time difference information indicating a difference due to the specific event to the expected job completion time; and
the processor sends the time difference information as the correction information to the terminal device by a push notification, or calculates a new expected job completion time based on the time difference information and sends the new expected job completion time as the correction information to the terminal device.

7. The server system described in claim 1, wherein:
the correction information is information indicating an event type of the specific event.

8. The server system described in claim 1, wherein:
the communicator receives from the monitored device, directly or through another device, information indicating an event type of the specific event; and
the processor sends the information indicating the event type as the correction information to the terminal device, or identifies, based on the information indicating the event type, time difference information indicating a difference to the job completion time information due to the specific event, and sends the identified time difference information as the correction information to the terminal device by push notification, or sends new job completion time information acquired based on the time difference information as the correction information to the terminal device by push notification.

9. The server system described in claim 8, wherein:

the processor, when information indicating an event type that enables predicting an event execution time is received, sends information indicating the event type, or the time difference information, or the job completion time information, to the communicator by push notification at the time the event occurs, and when information indicating an event type that does not enable predicting an event execution time is received, sends information indicating the time difference information, or the job completion time information, to the communicator by push notification at the time the event ends.

10. The server system described in claim 1, wherein:

the monitored device is a printer; and the specific event is at least one of a cleaning operation event, a print medium jam event, a no-print media event, a no-ink event, or an event indicating movement of the ink head is less than a specific amount.

11. An operating information collection system comprising:

the server system described in claim 1; and the terminal device.

12. An operating method of a server system configured to collect operating information of a monitored device through a network, comprising:

receiving, from the monitored device, job completion time information indicating an expected completion time of a job that is being performed on the monitored device;

sending, to a terminal device configured to display the job completion time information, the job completion time information received from the monitored device; and when a specific event occurs after the job has started and before the job is completed at the monitored device, the specific event causing a change of the expected job completion time, receiving a notification related to the specific event from the monitored device directly or through another device, and sending correction information related to the change of the expected job completion time to the terminal device by a push notification, wherein when a remaining time information count-down process is executed on the terminal device, the correction information includes an instruction to stop the count-down process on the terminal device to the terminal device by push notification.

13. A server system configured to collect operating information of a monitored device through a network, the server system comprising:

a communicator configured to receive, from the monitored device, operating information including at least job completion time information indicating an expected completion time of a job that is being performed on the monitored device; and a processor configured to control the communicator and cause the communicator to perform the following:

send, to a terminal device configured to display the job completion time information, the job completion time information received from the monitored device, and when a specific event occurs after the job has started and before the job is completed at the monitored device, the specific event causing a change of the expected job completion time, receive a notification related to the specific event from the monitored device directly or through another device, and send correction information related to the change of the expected job completion time to the terminal device by a push notification, when information indicating an event type of the specific event that does not enable predicting an event execution time is received, send information indicating the time difference information, or the job completion time information, to the communicator by push notification at the time the event ends.

14. The server system described in claim 13, wherein:

the correction information is information generated by the processor based on the notification received from the monitored device in response to the specific event.

15. The server system described in claim 14, wherein:

information generated by the processor based on the notification is new job completion time information expected after the specific event is completed, or is time difference information indicating a difference due to the specific event to the job completion time information.

16. The server system described in claim 13, wherein:

the communicator receives from the monitored device, directly or through another device, the job completion time information newly expected after the specific event has completed; and the processor sends the newly expected job completion time information as the correction information to the terminal device by push notification.

17. The server system described in claim 13, wherein:

the notification received, from the monitored device, directly or through another device, includes time difference information indicating a difference due to the specific event to the expected job completion time; and the processor sends the time difference information as the correction information to the terminal device by a push notification, or calculates a new expected job completion time based on the time difference information and sends the new expected job completion time as the correction information to the terminal device.

* * * * *